US010425238B2

(12) United States Patent
Poh et al.

(10) Patent No.: US 10,425,238 B2
(45) Date of Patent: *Sep. 24, 2019

(54) CONFLICT RESOLUTION AND RULE DETERMINATION IN A POLICY REALIZATION FRAMEWORK

(71) Applicant: AT&T Mobility II LLC, Atlanta, GA (US)

(72) Inventors: Lisuan Poh, Roswell, GA (US); Alka Roy, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,498

(22) Filed: Jun. 11, 2018

(65) Prior Publication Data

US 2018/0294984 A1    Oct. 11, 2018

Related U.S. Application Data

(63) Continuation of application No. 15/651,568, filed on Jul. 17, 2017, now Pat. No. 9,998,290, which is a
(Continued)

(51) Int. Cl.
*H04L 29/06* (2006.01)
*H04L 12/14* (2006.01)
(Continued)

(52) U.S. Cl.
CPC ......... *H04L 12/1407* (2013.01); *H04L 12/14* (2013.01); *H04L 12/1403* (2013.01);
(Continued)

(58) Field of Classification Search
CPC . H04L 12/1407; H04L 12/14; H04L 12/1403; H04L 67/322; H04W 4/24
See application file for complete search history.

(56) References Cited

U.S. PATENT DOCUMENTS

| 5,889,958 A | 3/1999 | Willens |
| 6,219,786 B1 | 4/2001 | Cunningham et al. |
| | (Continued) | |

OTHER PUBLICATIONS

U.S. Appl. No. 12/195,025, filed Aug. 20, 2008.
(Continued)

*Primary Examiner* — Theodore C Parsons
(74) *Attorney, Agent, or Firm* — Hartman & Citrin LLC

(57) ABSTRACT

Various systems and methods for providing a policy realization framework for a communications network are disclosed. The policy realization framework can be an application and service layer policy framework that is separate and distinct from the network layer policy framework. As such, policy decisions can be made remote from the network layer, and common policies across multiple networks are possible. A policy intelligence rules system for a policy realization framework, and methods of implementing the same, are also disclosed. The policy intelligence rules system can receive a policy request associated with a request for a network resource and policies pertaining to the policy request, which can include operator policies and subscriber specific policies. In response to determining that a policy conflict exists between the policies, the policy intelligence rules system can resolve the policy conflict and generate a rule for the communications network to use in response to the request.

20 Claims, 11 Drawing Sheets

Related U.S. Application Data continuation of application No. 12/195,000, filed on Aug. 20, 2008, now Pat. No. 9,712,331.

(51) Int. Cl.
| | |
|---|---|
| *H04W 4/24* | (2018.01) |
| *H04M 15/00* | (2006.01) |
| *H04W 12/08* | (2009.01) |
| *H04L 12/24* | (2006.01) |
| *H04L 29/08* | (2006.01) |

(52) U.S. Cl.
CPC ...... *H04L 41/0893* (2013.01); *H04L 63/0263* (2013.01); *H04M 15/66* (2013.01); *H04W 4/24* (2013.01); *H04W 12/08* (2013.01); *H04L 63/20* (2013.01); *H04L 67/322* (2013.01)

(56) References Cited

U.S. PATENT DOCUMENTS

| | | | |
|---|---|---|---|
| 6,393,474 | B1 | 5/2002 | Eichert et al. |
| 7,130,854 | B2 | 10/2006 | Beadles et al. |
| 7,447,755 | B1 | 11/2008 | Maxted et al. |
| 7,792,275 | B2 | 9/2010 | Tai et al. |
| 7,844,294 | B1 | 11/2010 | Manroa et al. |
| 7,864,716 | B1 | 1/2011 | Manroa et al. |
| 7,953,877 | B2 | 5/2011 | Vemula et al. |
| 8,131,831 | B1 | 3/2012 | Hu |
| 2002/0049841 | A1 | 4/2002 | Johnson et al. |
| 2003/0037040 | A1 | 2/2003 | Beadles et al. |
| 2003/0110212 | A1 | 6/2003 | Lewis |
| 2003/0172145 | A1 | 9/2003 | Nguyen |
| 2003/0182234 | A1 | 9/2003 | Degroot |
| 2004/0203750 | A1 | 10/2004 | Cowdrey et al. |
| 2004/0218607 | A1 | 11/2004 | Hurtta et al. |
| 2005/0114532 | A1 | 5/2005 | Chess et al. |
| 2006/0184490 | A1 | 8/2006 | Heim et al. |
| 2007/0121869 | A1 | 5/2007 | Gorti et al. |
| 2007/0162749 | A1 | 7/2007 | Lim |
| 2007/0199060 | A1 | 8/2007 | Touboul |
| 2007/0226775 | A1 | 9/2007 | Andreasen et al. |
| 2007/0238468 | A1 | 10/2007 | Buckley et al. |
| 2007/0258460 | A1 | 11/2007 | Momtahan et al. |
| 2007/0270123 | A1 | 11/2007 | Cai |
| 2008/0013533 | A1 | 1/2008 | Bogineni et al. |
| 2008/0046963 | A1 | 2/2008 | Grayson et al. |
| 2008/0201179 | A1 | 8/2008 | Maes |
| 2008/0271113 | A1 | 10/2008 | Belling |
| 2008/0273553 | A1 | 11/2008 | Wang |
| 2009/0049518 | A1 | 2/2009 | Roman et al. |
| 2009/0083408 | A1 | 3/2009 | Hecht et al. |
| 2009/0093231 | A1 | 4/2009 | Zhao |
| 2009/0113514 | A1 | 4/2009 | Hu |
| 2009/0177650 | A1 | 7/2009 | Petersson et al. |
| 2009/0228953 | A1 | 9/2009 | Hu et al. |
| 2009/0287627 | A1 | 11/2009 | Van Elburg |
| 2010/0043053 | A1 | 2/2010 | Wei et al. |
| 2010/0121960 | A1 | 5/2010 | Baniel et al. |
| 2010/0235620 | A1 | 9/2010 | Nylander et al. |
| 2010/0257599 | A1 | 10/2010 | Gleichauf |
| 2010/0299741 | A1 | 11/2010 | Harrison et al. |
| 2011/0041182 | A1 | 2/2011 | Stenfelt |
| 2011/0113480 | A1 | 5/2011 | Ma et al. |
| 2012/0066487 | A1 | 3/2012 | Brown et al. |
| 2012/0304277 | A1 | 11/2012 | Li |

OTHER PUBLICATIONS

U.S. Appl. No. 12/195,045, filed Aug. 20, 2008.
U.S. Appl. No. 12/195,060, filed Aug. 20, 2008.
U.S. Appl. No. 12/195,102, filed Aug. 20, 2008.
U.S. Office Action dated Dec. 20, 2011 in U.S. Appl. No. 12/195,025.
U.S. Notice of Allowance dated Jul. 5, 2012 in U.S. Appl. No. 12/195,025.
U.S. Office Action dated Mar. 29, 2010 in U.S. Appl. No. 12/195,045.
U.S. Office Action dated Sep. 7, 2010 in U.S. Appl. No. 12/195,045.
U.S. Office Action dated Aug. 8, 2011 in U.S. Appl. No. 12/195,045.
U.S. Office Action dated Dec. 20, 2011 in U.S. Appl. No. 12/195,045.
U.S. Office Action dated Nov. 8, 2012 in U.S. Appl. No. 12/195,045.
U.S. Notice of Allowance dated Apr. 25, 2013 in U.S. Appl. No. 12/195,045.
U.S. Notice of Allowance dated May 24, 2013 in U.S. Appl. No. 12/195,045.
U.S. Office Action dated Dec. 27, 2010 in U.S. Appl. No. 12/195,078.
U.S. Office Action dated Jun. 7, 2011 in U.S. Appl. No. 12/195,078.
U.S. Office Action dated Oct. 6, 2011 in U.S. Appl. No. 12/195,078.
U.S. Office Action dated Apr. 26, 2012 in U.S. Appl. No. 12/195,078.
U.S. Notice of Allowance dated Apr. 1, 2013 in U.S. Appl. No. 12/195,078.
U.S. Office Action dated May 19, 2011 in U.S. Appl. No. 12/195,102.
U.S. Office Action dated Nov. 2, 2011 in U.S. Appl. No. 12/195,102.
U.S. Office Action dated Jan. 22, 2013 in U.S. Appl. No. 12/195,102.
U.S. Office Action dated May 28, 2013 in U.S. Appl. No. 12/195,102.
U.S. Office Action dated Sep. 9, 2013 in U.S. Appl. No. 12/195,102.
U.S. Office Action dated Dec. 30, 2013 in U.S. Appl. No. 12/195,102.
U.S. Office Action dated Mar. 2, 2011 in U.S. Appl. No. 12/195,060.
U.S. Office Action dated Aug. 4, 2011 in U.S. Appl. No. 12/195,060.
U.S. Office Action dated Feb. 5, 2013 in U.S. Appl. No. 12/195,060.
U.S. Office Action dated Jun. 14, 2013 in U.S. Appl. No. 12/195,060.
Leonidas Lymberopoulos, Emil Lupu and Morris Sloman, An Adaptive Policy-Based Framework for Network Services Management, Journal of Network and Systems Management, vol. 11, No. 3 (2003), 277-303, DOI: 10.1023/A:1025719407427, pp. 1-27.
Beigi, M.S.; Calo, S.; Verma, D., "Policy transformation techniques in policy-based systems management," Policies for Distributed Systems and Networks, 2004. POLICY 2004. Proceedings. Fifth IEEE International Workshop on , vol., No., pp. 13-22, Jun. 7-9, 2004, URL: http://ieeexplore.ieee.org/stamp/stamp.jsp?tp=&arn.
Jun He; Hiltunen, M.A.; Schlichting, R.D.; , "Customizing dependability attributes for mobile service platforms," Dependable Systems and Networks, 2004 International Conference on , vol., No., pp. 617-626, Jun. 28-Jul. 1, 2004, doi: 10.1109/DSN.2004.1311932, URL: http://ieeexplore.ieee.org/stamp/stamp.jsp?tp=&arnumber=1311932&isnumber=29105.
Boutaba el al. "Towards Extensible Policy Enforcement Point," Springer-Verlag Berlin Heidelbergm, pp. 247-261, (2001).
Gopal et al., "User plane Firewall for 3G Mobile Network," IEEE, pp. 2117-2121 (2003).
Verma, Dinesh C., "Simplifying Network Administration using Policy based Management," pp. 1-8, (Aug. 2002).
Overview of 3GPP Release 6, Summary of all Release 6 Features, Version TSG #33 (ETSI Mobile Competence Centre) 2006.
3GPP TS 23.203 V7.3.0, Jun. 2007, 3GPP Organizational Partners, Release 7, pp. 20-42.
U.S. Office Action dated Feb. 16, 2011 in U.S. Appl. No. 12/195,000.
U.S. Office Action dated Aug. 5, 2011 in U.S. Appl. No. 12/195,000.
U.S. Office Action dated Jun. 19, 2014 in U.S. Appl. No. 12/195,000.
U.S. Office Action dated Feb. 10, 2015 in U.S. Appl. No. 12/195,000.
U.S. Office Action dated Aug. 23, 2016 in U.S. Appl. No. 12/195,000.
U.S. Notice of Allowance dated Mar. 8, 2017 in U.S. Appl. No. 12/195,000.
U.S. Office Action dated Sep. 29, 2017 in U.S. Appl. No. 15/651,568.
U.S. Notice of Allowance dated Jan. 31, 2018 in U.S. Appl. No. 15/651,568.

CONFLICT RESOLUTION AND RULE DETERMINATION IN A POLICY REALIZATION FRAMEWORK

CROSS-REFERENCE TO RELATED APPLICATIONS

This application is a continuation of and claims priority to U.S. patent application Ser. No. 15/651,568 entitled "Conflict Resolution and Rule Determination in a Policy Realization Framework," filed Jul. 17, 2017, now U.S. Pat. No. 9,998,290, which is expressly incorporated herein by reference in its entirety and which is a continuation of U.S. patent application Ser. No. 12/195,000, entitled "Systems and Methods for Performing Conflict Resolution and Rule Determination in a Policy Realization Framework," filed Aug. 20, 2008, now U.S. Pat. No. 9,712,331, which is expressly incorporated herein by reference in its entirety.

TECHNICAL FIELD

The present disclosure relates generally to communications networks and, more particularly, to systems and methods for implementing a policy intelligence rules system in a policy realization framework.

BACKGROUND

Applications and services of communications networks, i.e., network resources, are often provisioned in accordance with various policies, for example, application, service, subscriber, and/or operator policies. Policy management of the network resources is typically handled using a case-by-case approach. Policies for network resources are often put in place by a policy decision function, and the determined policy is applied by a policy enforcement point. Each network resource can have its own policy decision function and policy enforcement point.

Similarly, charging functions are often handled on a case-by-case basis. For example, a charging rules function containing predetermined charging rules often functions in-line with an application function. The predetermined charging rules are often applied to the provisioned network resource, and a traffic plane function can interface with a charging system to enforce usage charging. As such, a subscriber can be charged and/or billed for a provisioned network resource. Each network resource can have its own charging rules function and traffic plane function that enforces usage charging.

Because of the importance of the functions performed by the policy decision function and the charging rules function, there will often be a charging rules function, a policy decision function, a traffic plane function, and an enforcement point associated with each network resource.

SUMMARY

According to an embodiment of the present disclosure, an enhanced subscription profile repository for a policy realization framework of a communications network includes a processor, a communications network interface, and a memory in communication with the processor and the communications network interface. The memory is configured to store instructions, executable by the processor to receive subscriber data via the communications network interface, store the subscriber data in the memory, receive a request for the subscriber data from an element of the policy realization framework of the communications network, the request being received via the communications network interface, analyze the request and the subscriber data to identify relevant subscriber data, the relevant subscriber data including subscriber data that affects a policy relating to the request, and to send the relevant subscriber data to the element of the policy realization framework of the communications network via the communications network interface.

In some embodiments, the instructions stored in the memory further include instructions, executable by the processor to receive a request for the subscriber data from a node of the communications network, the request being received via the communications network interface, analyze the request and the subscriber data to identify relevant subscriber data, the relevant subscriber data including subscriber data that affects a policy relating to the request, and to send the relevant subscriber data to the node of the communications network via the communications network interface.

In some embodiments, the subscriber data includes data that identifies one or more rate plans stored as subscription profile data, and in some embodiments, the subscriber data includes data that identifies a subscriber preference stored as subscriber profile data. The subscriber preference can relate to an application accessible by the subscriber.

According to another embodiment of the present disclosure, a method for providing subscriber data to a communications network includes receiving subscriber data at an enhanced subscriber profile repository via a communications network interface, storing the subscriber data in a memory of the enhanced subscription profile repository, analyzing, at the enhanced subscriber profile repository, a request for the subscriber data from an element of a policy realization framework of the communications network, and the subscriber data stored at the enhanced subscriber profile repository, to identify relevant subscriber data, the relevant subscriber data including subscriber data that affects a policy relating to the request, and sending the relevant subscriber data to the element of the policy realization framework of the communications network via the communications network interface.

In some embodiments, the method further includes analyzing, at the enhanced subscriber profile repository, a request for the subscriber data received from a node of the communications network, and the subscriber data, to identify relevant subscriber data, the relevant subscriber data including subscriber data that affects a policy relating to the request, and sending the relevant subscriber data to the node of the communications network via the communications network interface.

In some embodiments, sending the relevant subscriber data to the element of the policy realization framework of the communications network includes sending the relevant subscriber data to a master policy repository (MPR) of the policy realization framework of the communications network.

In some embodiments, sending the relevant subscriber data to the node of the communications network includes sending the relevant subscriber data to a policy and charging rules function (PCRF) of the communications network.

According to another embodiment of the present disclosure, a computer readable medium includes computer readable instructions that, when executed, perform the steps of storing subscriber data received at an enhanced subscriber profile repository via a network interface, in a memory of the enhanced subscription profile repository, analyzing, at the enhanced subscriber profile repository, a request for the subscriber data received from an element of a policy realization framework of a communications network, and the subscriber data stored at the enhanced subscriber profile repository, to identify relevant subscriber data, the relevant subscriber data including subscriber data that affects a policy relating to the request, and sending the relevant subscriber data to the element of the policy realization framework of the communications network via the communications network interface.

In some embodiments, the computer readable medium further includes computer readable instructions that, when executed, perform the steps of analyzing, at the enhanced subscriber profile repository, a request for the subscriber data received from a node of the communications network, and the subscriber data, to identify relevant subscriber data, the relevant subscriber data including subscriber data that affects a policy relating to the request, and sending the relevant subscriber data to the node of the communications network via the communications network interface.

According to another embodiment of the present disclosure, a policy configuration and provisioning system for a policy realization framework of a communications network includes a processor, a communications network interface, and a memory in communication with the processor and the communications network interface. The memory is configured to store instructions, executable by the processor to receive rules from an element of the policy realization framework via the communications network interface, analyze the rules to determine how to instruct communications network nodes to provision resources in accordance with the rules, wherein the rules include a course of action determined by a policy intelligence rules system by analyzing and reconciling policies, generate network node instructions for the communications network nodes, the network node instructions including data executable by the communications network nodes to implement the rules, and send the network node instructions to the communications network nodes for implementation by the communications network nodes.

In some embodiments, the instructions executable by the processor to receive the rules include instructions executable by the processor to receive rules from a policy intelligence rules system of the policy realization framework of the communications network.

In some embodiments, the instructions executable by the processor to send the network node instructions include instructions executable by the processor to send the network node instructions to a policy and charging rules function of the communications network. The network node instructions can be in a format that is executable by the policy and charging rules function to direct the communications network to control the provisioning of a network resource. Controlling the provisioning of a network resource can include allowing, restricting, and/or denying a network resource.

In some embodiments, the policy configuration and provisioning system operates as an element in the policy layer of the policy realization framework of a communications network.

According to another embodiment of the present disclosure, a method for generating network node instructions executable by a communications network node to implement a rule generated by an element of a policy realization framework of the communications network includes analyzing rules received from an element of the policy realization framework to determine how to instruct the communications network nodes to provision resources in accordance with the rules, wherein the rules include a course of action determined by a policy intelligence rules system by analyzing and reconciling policies, generating network node instructions for the communications network nodes, the network node instructions including data executable by the communications network nodes to implement the rules, and sending the network node instructions to the communications network nodes for implementation by the communications network nodes.

In some embodiments, receiving rules includes receiving rules from a policy intelligence rules system of the policy realization framework of the communications network. The policy intelligence rules system can operate as an element in the policy layer of the policy realization framework of a communications network, and can analyze and reconcile policies to determine a rule that reflects the reconciled policies.

In some embodiments, sending the network node instructions includes sending the network node instructions to a policy and charging rules function of the communications network.

According to another embodiment of the present disclosure, a computer readable medium includes computer readable instructions that, when executed, perform the steps of analyzing rules received at a policy and configuration and provisioning system from an element of a policy realization framework of a communications network, the analyzing being performed to determine how to instruct a node of the communications network to provision resources in accordance with the rules, wherein the rules include a course of action determined by a policy intelligence rules system by analyzing and reconciling policies, generating instructions for the node of the communications network, the instructions including data executable by the node of the communications network to implement the rules, and sending the instructions to the node of the communications network for implementation by the node of the communications network.

In some embodiments, the computer medium further includes computer readable instructions that, when executed, perform the step of receiving rules from a policy intelligence rules system of the policy realization framework of the communications network. The policy intelligence rules system can operate as an element in the policy layer of the policy realization framework of a communications network, and can analyze and reconcile policies to determine a rule that reflects the reconciled policies.

In some embodiments, the computer medium further includes computer readable instructions that, when executed, perform the step of sending the network node instructions to a policy and charging rules function of the communications network.

According to another embodiment of the present disclosure, a policy intelligence rules system for a policy realization framework of a communications network includes a processor, a communications network interface, and a memory in communication with the processor and the communications network interface. The memory is configured to store instructions, executable by the processor to receive policies from a first repository element via the communications network interface, receive subscription data and subscriber data from a second repository element via the communications network interface, analyze the subscription data, the subscriber data, and the policies to determine if a conflict exists among the subscription data, the subscriber data, and the policies, and determine a rule. If a conflict is found, the rule can be determined by identifying the conflict that exists among the subscription data, the subscriber data, and the policies, resolving the conflict, and determining the rule based upon the subscription data, the subscriber data, and the policies available after the conflict is resolved. If a conflict is not found, the rule can be determined based solely upon the subscription data, the subscriber data, and the policies.

In some embodiments, the memory is further configured to store instructions, executable by the processor to identify the conflict by creating data that identifies the policies involved in the conflict and tagging the policies identified in the conflict for conflict resolution.

In some embodiments, the memory is further configured to store instructions, executable by the processor to resolve the conflict by providing precedence of one of the policies, the subscriber data, and the subscription data over any of the policies, the subscriber data, and the subscription data.

In some embodiments, the memory is further configured to store instructions, executable by the processor to determine the rule by analyzing the policies to determine how the communications network should handle a service request.

In some embodiments, the policies are one or more of operator policies, global subscriber policies, subscriber specific policies, and subscription specific policies.

In some embodiments, the first repository element is a master policy repository and the second repository element is an enhanced subscription profile repository.

In some embodiments, the memory is further configured to store instructions, executable by the processor to receive the policies from the first element of the policy realization framework in response to a trigger event.

In some embodiments, the rule is selected from a group consisting of a restrict access rule that restricts access to a requested service, a deny access rule that denies access to the requested service, and an allow access rule that allows access to the requested service.

According to another embodiment of the present disclosure, a method for operating a policy intelligence rules system for a policy realization framework of a communications network includes storing policies received at the policy intelligence rules system via a communications network interface from a first repository element of the policy realization framework, storing subscription data and subscriber data received at the policy intelligence rules system via the communications network interface from a second repository element of the policy realization framework, analyzing the subscription data, the subscriber data, and the policies to determine if a conflict exists among the subscription data, the subscriber data and the policies, and determining a rule. If a conflict is found, the rule can be determined by identifying the conflict that exists among the subscription data, the subscriber data, and the policies, resolving the conflict, and determining the rule based upon the subscription data, the subscriber data, and the policies available after the conflict is resolved. If a conflict is not found, the rule can be determined based solely upon the subscription data, the subscriber data, and the policies.

In some embodiments, identifying the conflict includes creating data that identifies the policies involved in the conflict and tagging the policies identified in the conflict for conflict resolution.

In some embodiments, resolving the conflict comprises providing precedence of one of the policies, the subscriber data, and the subscription data over any of the policies, the subscriber data, and the subscription data.

In some embodiments, determining the rule comprises analyzing the policies to determine how the communications network should handle a service request.

In some embodiments, the policies are one or more of operator policies, global subscriber policies, subscriber specific policies, and subscription specific policies.

In some embodiments, storing policies received at the policy intelligence rules system via the communications network from a first repository element of the policy realization framework includes storing the policies received at the policy intelligence rules system via the communications network from a master policy repository, and storing the subscription data and the subscriber data received at the policy intelligence rules system via the communications network from the second repository element of the policy realization framework includes storing the subscription data and the subscriber data received at the policy intelligence rules system via the communications network from an enhanced subscription profile repository.

In some embodiments, receiving the policies from the first element of the policy realization framework is in response to a trigger event.

In some embodiments, the rule is one of a restrict access rule that restricts access to a requested service, a deny access rule that denies access to the requested service, and an allow access rule that allows access to the requested service.

According to another exemplary embodiment of the present disclosure, a computer readable medium includes computer readable instructions that, when executed, perform the steps of storing policies received at the policy intelligence rules system via a communications network interface from a first repository element of the policy realization framework, storing subscription data and subscriber data received at the policy intelligence rules system via the communications network interface from a second repository element of the policy realization framework, analyzing the subscription data, the subscriber data, and the policies to determine if a conflict exists among the subscription data, the subscriber data and the policies, and determining a rule. If a conflict is found, the rule can be determined by identifying the conflict that exists among the subscription data, the subscriber data, and the policies, resolving the conflict, and determining the rule based upon the subscription data, the subscriber data, and the policies available after the conflict is resolved. If a conflict is not found, the rule can be determined based solely upon the subscription data, the subscriber data, and the policies.

In some embodiments, identifying the conflict includes creating data that identifies the policies involved in the conflict and tagging the policies identified in the conflict for conflict resolution.

In some embodiments, resolving the conflict comprises providing precedence of one of the policies, the subscriber data, and the subscription data over any of the policies, the subscriber data, and the subscription data.

In some embodiments, determining the rule comprises analyzing the policies to determine how the communications network should handle a service request.

In some embodiments, the policies are one or more of operator policies, global subscriber policies, subscriber specific policies, and subscription specific policies.

In some embodiments, storing policies received at the policy intelligence rules system via the communications network from a first repository element of the policy realization framework includes storing the policies received at the policy intelligence rules system via the communications network from a master policy repository, and storing the subscription data and the subscriber data received at the policy intelligence rules system via the communications network from the second repository element of the policy realization framework includes storing the subscription data and the subscriber data received at the policy intelligence rules system via the communications network from an enhanced subscription profile repository.

In some embodiments, receiving the policies from the first element of the policy realization framework is in response to a trigger event.

In some embodiments, the rule is one of a restrict access rule that restricts access to a requested service, a deny access rule that denies access to the requested service, and an allow access rule that allows access to the requested service.

According to another embodiment of the present disclosure, a master policy repository for a policy realization framework of a communications network includes a processor, a communications network interface, and a memory in communication with the processor and the communications network interface. The memory can be configured to store instructions, executable by the processor to receive a policy via the communications network interface, store the policy in the memory, receive a request for the policy from an element of the policy realization framework, the request being received via the communications network interface, and send the policy to the element.

In some embodiments, the element is one of an application function, an enhanced subscriber profile repository, and a network operator.

In some embodiments, the policy is one of an application specific policy, a service specific policy, a subscriber specific policy, a network specific policy, an operator specific policy, and a global subscriber policy.

In some embodiments, the memory is further configured to store instructions, executable by the processor to update the policy stored in the memory.

In some embodiments, the policy is updated in response to a new application function being registered with the communications network.

In some embodiments, the memory is further configured to store instructions, executable by the processor to request the policy from the element.

In some embodiments, the memory is further configured to store instructions, executable by the processor to delete the policy.

In some embodiments, the memory is further configured to store instructions, executable by the processor to categorize the policy prior to storing the policy as one of an application specific policy, a service specific policy, a subscriber specific policy, a network specific policy, an operator specific policy, and a global subscriber policy.

In another exemplary embodiment of the present disclosure, a method for operating a master policy repository for a policy realization framework of a communications network includes storing a policy received at the master policy repository via a communications network, receiving a request for the policy from an element of the policy realization framework of the communications network, the request being received via the communications network interface, and sending the policy to the element.

In some embodiments, sending the policy to the element includes sending the policy to one of an application function, an enhanced subscriber profile repository, and a network operator.

In some embodiments, storing, in the memory associated with the master policy repository, the policy received at the master policy repository via the communications network includes storing one of an application specific policy, a service specific policy, a subscriber specific policy, a network specific policy, an operator specific policy, and a global subscriber policy.

In some embodiments, the method further includes updating the policy. In some embodiments, updating the policy is in response to a new application function being registered with the communications network.

In some embodiments, the method further includes requesting the policy from the element.

In some embodiments, the method further comprises categorizing the policy prior to storing the policy as one of an application specific policy, a service specific policy, a subscriber specific policy, a network specific policy, an operator specific policy, and a global subscriber policy.

In another exemplary embodiment of the present disclosure, a computer readable medium includes computer readable instructions that, when executed, perform the steps of storing a policy received at the master policy repository via a communications network, receiving a request for the policy from an element of the policy realization framework of the communications network, the request being received via the communications network interface, and sending the policy to the element.

In some embodiments, sending the policy to the element includes sending the policy to one of an application function, an enhanced subscriber profile repository, and a network operator.

In some embodiments, storing, in the memory associated with the master policy repository, the policy received at the master policy repository via the communications network includes storing one of an application specific policy, a service specific policy, a subscriber specific policy, a network specific policy, an operator specific policy, and a global subscriber policy.

In some embodiments, the method further includes updating the policy. In some embodiments, updating the policy is in response to a new application function being registered with the communications network.

In some embodiments, the method further includes requesting the policy from the element.

In some embodiments, the method further comprises categorizing the policy prior to storing the policy as one of an application specific policy, a service specific policy, a subscriber specific policy, a network specific policy, an operator specific policy, and a global subscriber policy.

In another exemplary embodiment of the present disclosure, a policy realization framework of a communications network includes a logical policy layer that includes systems configured to create, store, and manage common policy rules for services and applications provided by the communications network, and a logical network layer that includes systems configured to provide rules decision operations and rules enforcement operations.

In some embodiments, the logical policy layer systems are further configured to centralize and reconcile the common policy rules for the services. In some embodiments, the logical policy layer systems are further configured to manage a lifecycle of the common policy rules. In some embodiments, the logical policy layer systems are further configured to configure and provision the common policy rules to the logical network layer systems.

In some embodiments, the common policy rules are offline rules. In some embodiments, the offline rules are shared with a roaming partner. In some embodiments, the common policy rules are online rules created in real-time.

In some embodiments, the services are converged services. In some embodiments, the services and applications are provided by a plurality of application functions.

In some embodiments, the logical network layer systems are further configured to provide differential charging. In some embodiments, the logical network layer systems are further configured to provide gating control.

In some embodiments, the logical network layer systems are further configured to trigger a notification to notify a subscriber that an action is to be taken. In some embodiments, the trigger is an online trigger. In some embodiments, the trigger is an offline trigger.

According to another embodiment of the present disclosure, an intelligent security gateway for interfacing with a policy realization framework of a communications network includes a processor, a communications network interface, and a memory in communication with the processor and the communications network interface. The memory can be configured to store instructions, executable by the processor to identify a security threat, wherein the security threat includes network traffic that poses a threat to the integrity of one or more nodes of the communications network, determine an enforcement point for neutralizing the security threat, wherein neutralizing the security threat includes preventing the security threat from affecting the integrity of the one or more nodes of the communications network, and update a security threat registry with data that identifies the security threat to enable future recognition of a substantially similar security threat by the intelligent security gateway.

In some embodiments, the instructions further include instructions executable by the processor to enforce a security policy at the intelligent security gateway. The intelligent security gateway can enforce the security policy by preventing the network traffic from accessing the communications network.

In some embodiments, the instructions further include instructions executable by the processor to send a notification of the security threat to an enforcement point of the communications network. The notification sent to the enforcement point can identify the security threat. In some embodiments, the enforcement point is a policy charging and rules function (PCRF) of the communications network.

According to another embodiment of the present disclosure, a method for operating an intelligent security gateway and updating a security threat registry of a communications network includes identifying a security threat, wherein the security threat includes network traffic that poses a threat to the integrity of one or more nodes of the communications network, determining an enforcement point for neutralizing the security threat, wherein neutralizing the security threat includes preventing the security threat from affecting the integrity of the one or more nodes of the communications network, and updating a security threat registry with data that identifies the security threat to enable future recognition of a substantially similar security threat by the intelligent security gateway.

In some embodiments, the method further includes enforcing a security policy at the intelligent security gateway. The intelligent security gateway can enforce the security policy by preventing the network traffic from accessing the communications network.

In some embodiments, the method further includes sending a notification of the security threat to an enforcement point of the communications network, wherein the notification identifies the security threat. The enforcement point of the communications network can include a policy charging and rules function (PCRF) of the communications network.

According to another embodiment of the present disclosure, a computer readable medium including computer readable instructions that, when executed, perform the steps of identifying a security threat, wherein the security threat includes network traffic that poses a threat to the integrity of one or more nodes of the communications network, determining an enforcement point for neutralizing the security threat, wherein neutralizing the security threat includes preventing the security threat from affecting the integrity of the one or more nodes of the communications network, and updating a security threat registry with data that identifies the security threat to enable future recognition of a substantially similar security threat by the intelligent security gateway.

In some embodiments, the computer readable medium further includes computer readable instructions that, when executed, perform the step of identifying, at an intelligent security gateway, the security threat.

In some embodiments, the computer readable medium further includes computer readable instructions that, when executed, perform the step of enforcing a security policy at the intelligent security gateway, wherein the intelligent security gateway enforces the security policy by preventing the network traffic from accessing the communications network.

In some embodiments, the computer readable medium further includes computer readable instructions that, when executed, perform the step of sending a notification of the security threat to an enforcement point of the communications network, wherein the notification identifies the security threat. The enforcement point can be a policy charging and rules function (PCRF) of the communications network.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
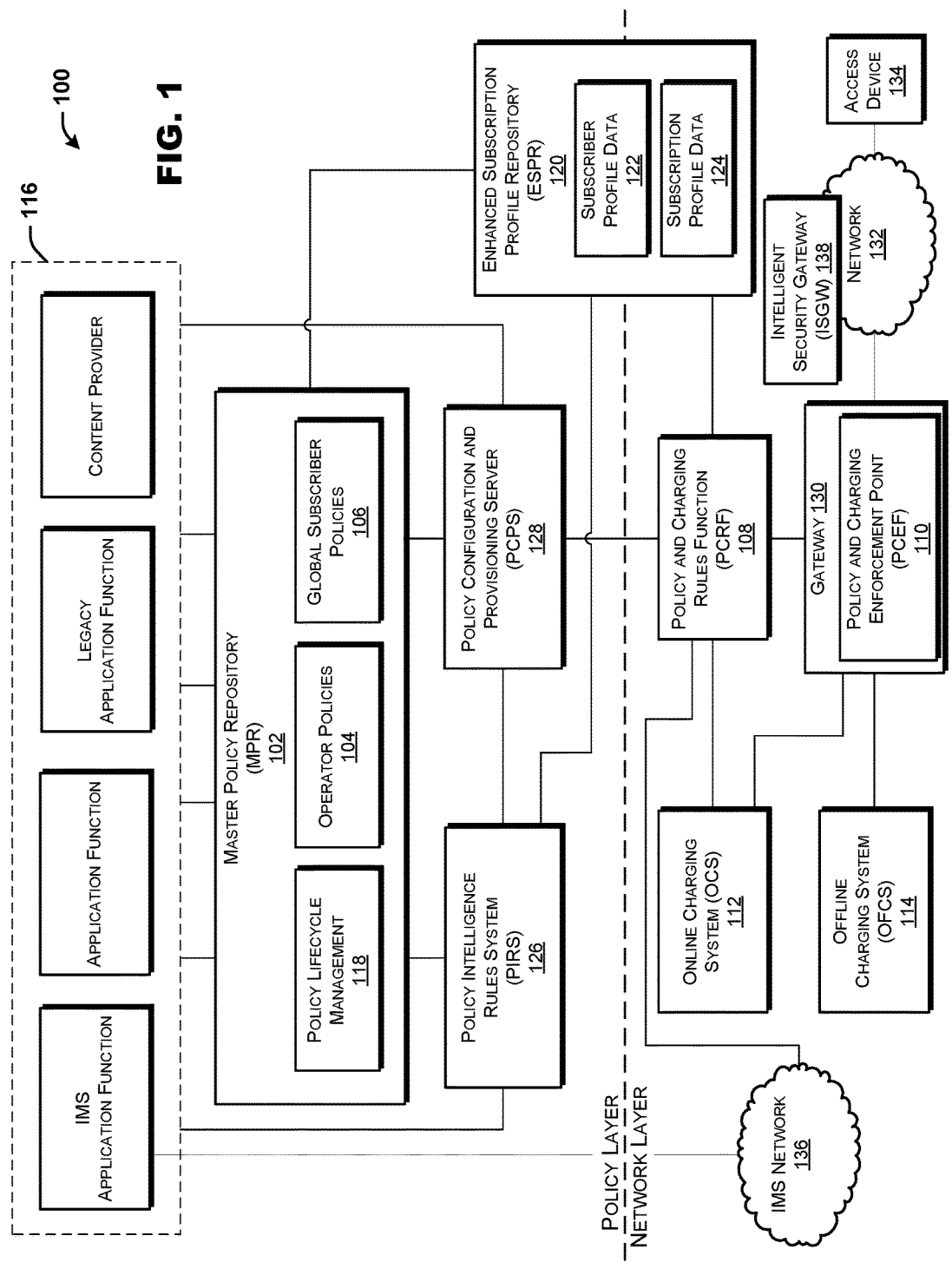
FIG. 1 schematically illustrates a policy realization framework, according to an exemplary embodiment of the present disclosure.

Referring now to the drawings in which like numerals represent like elements throughout the several views, FIG. 1 schematically illustrates a policy realization framework 100. The illustrated policy realization framework 100 is divided into two logical layers, a policy layer and a network layer.

In one embodiment, the policy layer includes application and service policy management systems and network policy management systems. The policy layer can store, organize, determine, and apply policy rules to services requested by subscribers or other entities, as will be explained in more detail below. The policy layer can provide common policy rules across services and applications, and policy rule management. The policy layer can dynamically determine rules based upon operator policies, network policies, subscriber specific policies, subscription specific policies, subscriber profile data, subscription profile data, and/or subscriber preferences, for example. The policy layer can also generate instructions or commands for driving elements in the network layer to grant, restrict, and/or deny requested services. Rules can be determined online, i.e., during a service or application session, and in real-time or near real-time. Additionally or alternatively, the policy rules can be determined offline, i.e., not during a service or application session.

The systems, functions, servers, and repositories illustrated in the policy layer are configured to support aspects of the present disclosure that are related to centralizing and reconciling common rules for data services, policy rule creation, policy lifecycle management, dynamic in-call (online) data flow rules invocation, offline policy and rules sharing across roaming partner networks, policy-enabled converged services and applications, and configuration and provisioning of policy rules to network entities in the network layer.

The systems, functions, enforcement points, and networks illustrated in the network layer are configured to support aspects of the present disclosure that are related to rules decision aspects, rules enforcement aspects, differential charging, gating control, and trigger notification (online or offline) to notify a subscriber that an action is to be taken. Elements of the policy layer and network layers are described immediately below starting with elements of the policy layer.

The illustrated policy layer includes a master policy repository (MPR) 102. The MPR 102 receives, retrieves, accesses, organizes, and/or manages operator policies 104 and global subscriber policies 106.

Operator policies 104 can include native operator policies and/or shared operator policies, such as, but not limited to, gating control policies, data throttling policies, packet inspection policies, security policies, privacy policies, emergency policies, charging policies, application-specific policies, global application policies, service-specific policies, global service policies, content provider policies, legacy policies, and the like. Operator policies 104 can be defined and approved by operator personnel, such as, for example, operator stakeholders, engineers, technicians, business users, and the like.

Operator policies can include, for example, gating control by a policy and charging rules function (PCRF) 108, a policy and charging enforcement point (PCEF) 110, a wireless application protocol (WAP) gateway (not shown), deep packet inspection (DPI) points (not shown), and/or other enforcement points that require service rules to help ensure consistent policy enforcement packet data protocol (PDP) context.

Charging policies can include, for example, online and offline charging policies implemented by the PCRF 108, the PCEF 110, an online charging system (OCS) 112, and/or an offline charging system (OFCS) 114. A charging identification can be provided to the MPR 102 by policy approval personnel or a network entity to notify the PCRF 108, PCEF 110, OCS 112, and/or OFCS 114 that a policy is strictly for offline charging or online charging.

Other operator policies 104 can include, for example, policies used by the PCRF 108 and PCEF 110 for policy decision making and enforcement, dynamic policy invocation by application functions (AF's) 116, and converged service policies.

Global subscriber policies 106 can include, but are not limited to, policies that are global to all subscribers and applied to one or more applications or services that are accessible to the operator's subscriber base. Global subscriber policies 106 can be defined for each service or application. By way of example and not limitation, a global subscriber policy 106 can be a service aware roaming control policy that can prevent a subscriber from accessing operator-defined services or applications while roaming. Local roaming control at the MPR 102 can help eliminate the need for disparate service aware roaming control mechanisms performed at the content provider/application function level 116. Accordingly, the operator can be more aware of the policies being enforced upon the operator's subscriber base than the operator would be relying solely upon a third party.

The MPR 102 can also be configured with a policy lifecycle management environment 118. Policies can be created, approved, and updated offline. The policy lifecycle management environment 118 can provide business users and management users accessibility to create policies and route policies for approval by stakeholders, engineers, and other approval personnel, for example. The lifecycle management environment 118 can include translation functions whereby policies can be translated into a format recognized by the destination network entity. A policy lifetime can be specified by the operator, and/or obsolete policies can be recognized by the MPR 102. Obsolescence recognition can be based upon, for example, whether the application or service associated with the policy is functioning or accessible by subscribers.

The MPR 102 can be fed by other policy repositories, such as a dedicated operator policy repository (not shown) and/or enterprise policy repository (not shown). Early implementations of the present disclosure can, for example, utilize a separate repository for storing operator policies that can be later integrated at least partially into the MPR 102. In the illustrated embodiment, the MPR 102 is fed by an enhanced subscription profile repository (ESPR) 120 that can be configured to store subscriber profile data 122 and subscription profile data 124. In an alternative embodiment, at least a portion of the data stored in the ESPR 120 can be stored locally in the MPR 102. The ESPR 120 can be at least partially migrated to the MPR 102. Accordingly, the MPR 102 would be expanded to facilitate local storage of the ESPR 120 data. The illustrated ESPR 120 is described in greater detail below.

The ESPR 120 can be configured as a read-only repository for storage of subscriber profile data 122 and subscription profile data 124. Subscriber profile data 122 can include subscriber specific data related to service entitlement, service prohibition, and other subscriber profile data for policy rule generation and service enforcement. The subscriber profile data 122 can include policy-related data, such as rate plan, rate plan categories, service entitlement for rate plan or rate plan categories, pre-emption priorities for differential charging or treatment types, and service related roaming entitlement. Subscriber profile data 122 can also include payment type so that internet protocol (IP) flow can be routed to the appropriate charging system 112, 114 for prepaid or postpaid payment types. Other payment types using operator or subscriber-defined use limits can be indicated in the subscriber profile data 122. Payment type information can be used to determine if IP flow and PDP context should be quota requested. The subscriber profile data 122 can also include class of service (CoS) entitlement for messaging, such as short message service (SMS) and multimedia message service (MMS) messaging, as well as other network services. A CoS can include originating CoS and terminating CoS.

The ESPR 120 can retrieve and permanently or temporarily store data from other sources (not shown), such as, a master subscription database, a location register, or other subscriber or subscription data source. The ESPR 120 can communicate with the MPR 102 and other data sources (not shown) using low latency links for latency sensitive operations. It should be understood that some or all of the subscriber profile data 122 stored in the ESPR 120 can be similar or can overlap with like data stored in the MPR 102.

The subscription profile data 124 can include all available service plans offered by an operator as defined, maintained, and updated, for example, by operator service offer management personnel. Service plans can include various categories, such as data rate plans for stand-alone or integrated network cards for use in computer systems (e.g., laptop computers), data rate plans with voice plan add-ons, data rate plans combined with voice plans, international voice plans, international data plans, pooled plans, government plans, WiFi add-on plans, device-specific plans, push email plans, business plans, media bundles, global positioning system (GPS) plans, any combination thereof, and the like. Each service plan can have normal operation and roaming entitlements for domestic and international plans. Roaming entitlements enable the operator to provide flat rate service plans for international roaming as defined by thresholds, country, and roaming operator. Subscriber profile data 122 can also include subscriber-specific policies. As described above, global subscriber policies 106 can be stored in the MPR 102. It should be understood that some or all of the subscription profile data 124 stored in the ESPR 120 can be similar or can overlap with like data stored in the MPR 102.

The MPR 102 can send policies to a policy intelligence rules system (PIRS) 126. The PIRS 126 can be configured to request operator policies 104 and global subscriber policies 106 from the MPR 102, and subscriber profile data 122 and subscription profile data 124 from the ESPR 120. The PIRS 126 can identify policy conflicts, resolve conflicts, and determine applicable rules to be sent to a policy configuration and provisioning server (PCPS) 128 for configuration and provisioning to the network layer for rule decision and enforcement operations. The PIRS 126 is described in greater detail below.

The PCPS 128 is a policy layer entity configured to receive rules created by the PIRS 126 and provide the rules to policy elements in the network layer, such as, the PCRF 108 and OCS 112. The PCPS 128 is illustrated as being in communication with one PCRF 108, although this is not necessarily the case and multiple PCRF's 108 and PCEF's 110 are contemplated. By way of example and not limitation, the PCPS 128 can identify rules as common to the PCRF 108 and PCEF 110, rules for the PCRF 108 only, rules for the PCEF 110 only, and rules for the OCS 112. In addition, the PCPS 128 can be configured to accept rules and policies from another policy management platform and prepare the rules for storage in the MPR 102.

The PCRF 108 is a decision point function in the network layer for control, altering of Quality of Service (QoS), where applicable, and providing dynamic or personalized charging rules at a subscriber level. The dynamic charging rules can be based on operator-defined dimensions such as, for example, roaming control, usage threshold, and based upon the subscriber entitlements, subscriber prohibitions, and/or subscriber and subscription profile data 122, 124.

The PCRF 108 can also trigger messages and/or notifications to subscribers for events such as, for example, differential charges, or if the PCRF 108 is triggered to treat the subscriber differently than the subscriber's expected treatment. For example, the PCRF 108 can note that an enhanced charge rate, dropped IP flow, and/or QoS change will be invoked for a service or application. Upon such as determination, the PCRF 108 can trigger a notification to a subscriber relating to the change. Alternatively, if the PCRF 108 cannot recognize the change, the PCEF 110 or OCS 112 can trigger the notification.

The PCEF 110 is an enforcement point function that can reside in a General Radio Packet Service (GPRS) gateway function 130, such as a gateway GPRS support node (GGSN). The PCEF 110 can enforce subscriber level control and charging policies for PDP contexts and IP flow, for example. The PCEF 110 can be invoked by the rules passed to the PCEF 110 by the PCRF 108. Additionally, or alternatively, the PCEF 110 can be invoked by a charging event trigger. The PCEF 110 can respond to charging event triggers by triggering the OCS 112 to take actions including, for example, providing an "advice of charge," or tracking usage.

The AF's 116 can include any application or service accessible by network subscribers. By way of example and not limitations, AF's 116 can provide location-based services, presence-based services, music services, video services, mobile television services, and the like. The illustrated AF's 116 include IMS application functions accessible via the Internet Protocol Multimedia System (IMS) network 136, legacy application functions for legacy networks, other application functions, and content providers.

The IMS network 136 can enable the support for IP multimedia applications within a UMTS wireless communications network. Enabling Public Land Mobile Network (PLMN) operators to offer their subscribers multimedia services based on and built upon Internet applications, services and protocols. These protocols include session initiation protocol (SIP), which is used to manage the IP multimedia sessions.

The gateway 130 function can allow for communication with a network 132. The network 132 can provide one or more devices 134 access to services and applications provided by the AF's 116 via wireless access technologies. The access device(s) 134 can include, but is not limited to, handheld devices such as an information appliance, a smartphone, a personal digital assistant (PDA), a mobile phone, a personal communicator, and a handheld game console; other mobile devices such as laptop computers; stationary devices such as desktop computers, servers, and the like; and various other telephony devices.

The wireless access technologies can include, but are not limited to, GSM (Global System for Mobile communications), CDMA (Code Division Multiple Access), UMTS (Universal Mobile Telecommunications System) network, and provide data communications via EDGE (Enhanced Data rate for Global Evolution), the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA), for example. The network 132 is also compatible with future wireless technologies including, but not limited to, pre-4G and 4G standards, for example. Other wireless access technologies are contemplated. The network can include, for example, core network elements for circuit switched and packet switched communications and access networks for supporting the aforementioned wireless access technologies.

The aforementioned description of the policy realization framework 100 has provided an overview of the policy layer elements and network layer elements according to an exemplary embodiment of the present disclosure. The policy layer elements are described in more detail below with reference to FIGS. 2-9. The policy realization framework 100 can also include an intelligent security gateway 138 (ISGW). The ISGW 138 is described below with reference to FIGS. 10-11.

Figure 2:
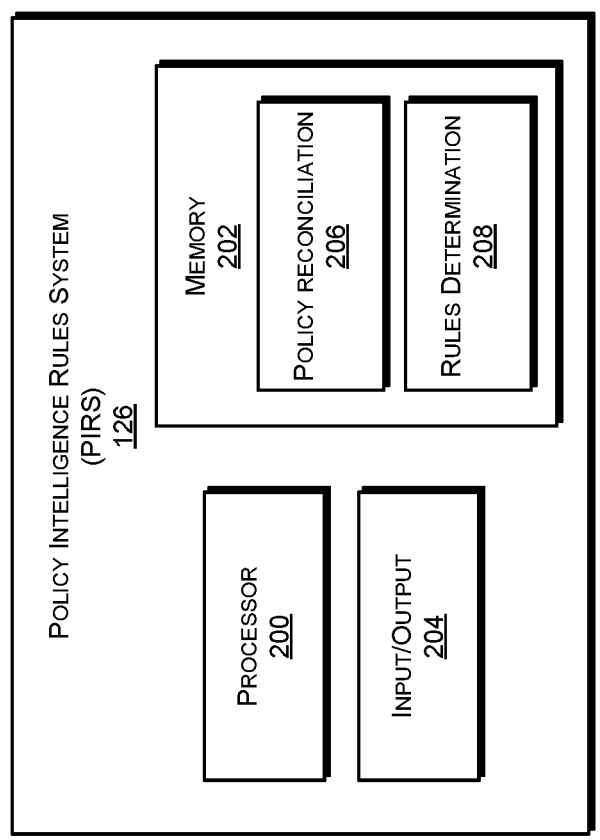
FIG. 2 schematically illustrates a policy intelligence rules system, according to an exemplary embodiment of the present disclosure.

Referring now to FIG. 2, the policy intelligence rules system (PIRS) 126 is illustrated, according to an exemplary embodiment of the present disclosure. The illustrated PIRS 126 includes a processor 200 that can be in communication with a memory 202, and an input/output (I/O) interface 204 via a bus (not shown). The processor 200 can be a single or multiple processor system implemented on a single processor chip or multiple processor chips for controlling, and/or processing instructions and/or data stored in the memory 202.

The memory 202 can interface with the processor 200 for the storage of data and/or instructions, such as policy reconciliation instructions 206 and rules determination instructions 208. The memory 202 can include a variety of computer readable media, including volatile media, non-volatile media, removable media, and non-removable media. Computer-readable media can include device storage media and communication media. Storage media can include volatile and/or non-volatile, removable and/or non-removable media, such as, for example, RAM, ROM, EEPROM, flash memory or other memory technology, CD ROM, DVD, or other optical disk storage, magnetic tape, magnetic disk storage or other magnetic storage devices, or any other medium. The I/O interface 204 can be provided for input/output of policies, rules, subscriber data, and subscription data to and from the MPR 102, the ESPR 120 and the PCPS 128, for example.

Figure 7:
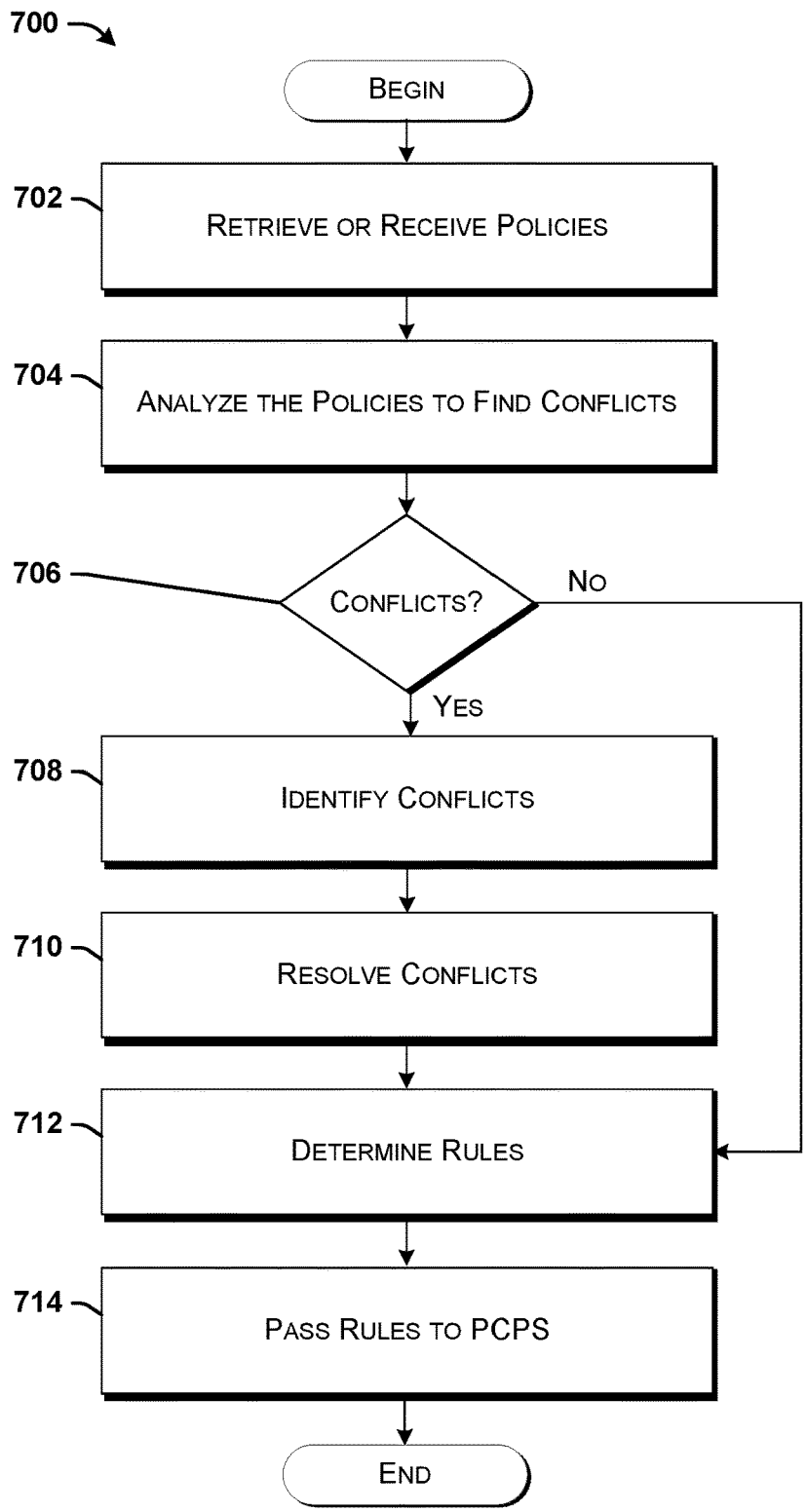
FIG. 7 schematically illustrates a method for operating a policy intelligence rules system, according to an exemplary embodiment of the present disclosure.

The PIRS 126 can request policies from the MPR 102 or receive policies pushed by the MPR 102 and execute, via the processor 200, the policy reconciliation instructions 206. The policy reconciliation instructions 206 can instruct the processor 200 to search for potential policy conflicts, identify conflicts, resolve conflicts, determine rules based upon the policies, and pass the rules to the PCPS 128 for configuration and provisioning to the network layer policy decision and enforcement elements. An exemplary method for operating the PIRS 126 is illustrated in FIG. 7 and described in detail below.

Figure 3:
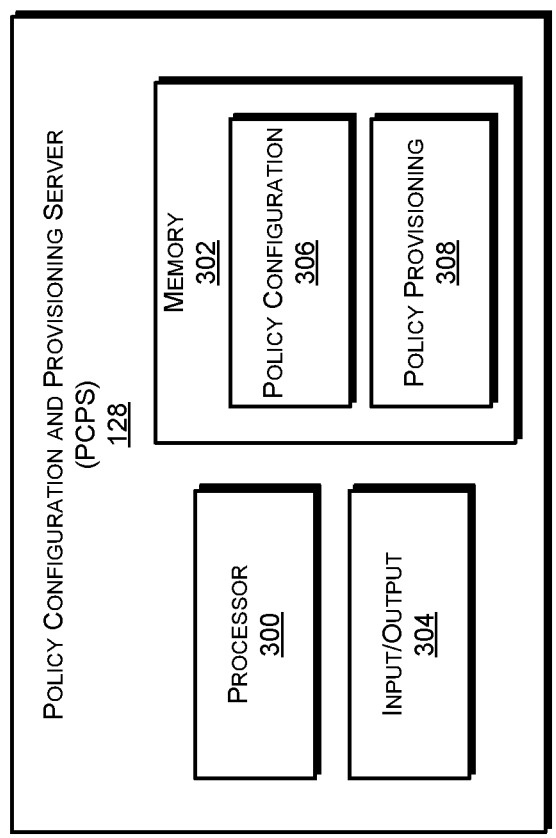
FIG. 3 schematically illustrates a policy configuration and provisioning system, according to an exemplary embodiment of the present disclosure.

Referring now to FIG. 3, the policy configuration and provisioning server (PCPS) 128 is illustrated, according to an exemplary embodiment of the present disclosure. The illustrated PCPS 128 includes a processor 300 that can be in communication with a memory 302, and an input/output (I/O) interface 304 via a bus (not shown). The processor 300 can be a single or multiple processor system implemented on a single processor chip or multiple processor chips for controlling, and/or processing instructions and/or data stored in the memory 302.

The memory 302 can interface with the processor 300 for the storage of data and/or instructions, such as policy configuration instructions 306 and policy provisioning instructions 308. The memory 302 can include a variety of computer readable media, including volatile media, non-volatile media, removable media, and non-removable media. Computer-readable media can include device storage media and communication media. Storage media can include volatile and/or non-volatile, removable and/or non-removable media, such as, for example, RAM, ROM, EEPROM, flash memory or other memory technology, CD ROM, DVD, or other optical disk storage, magnetic tape, magnetic disk storage or other magnetic storage devices, or any other medium. The I/O interface 304 can receive rules from the PIRS 126 and send instructions to the PCRF 108, PCEF 110, and OCS 112 in the network layer for policy rule charging decisions, charging, and enforcement, for example.

Figure 8:
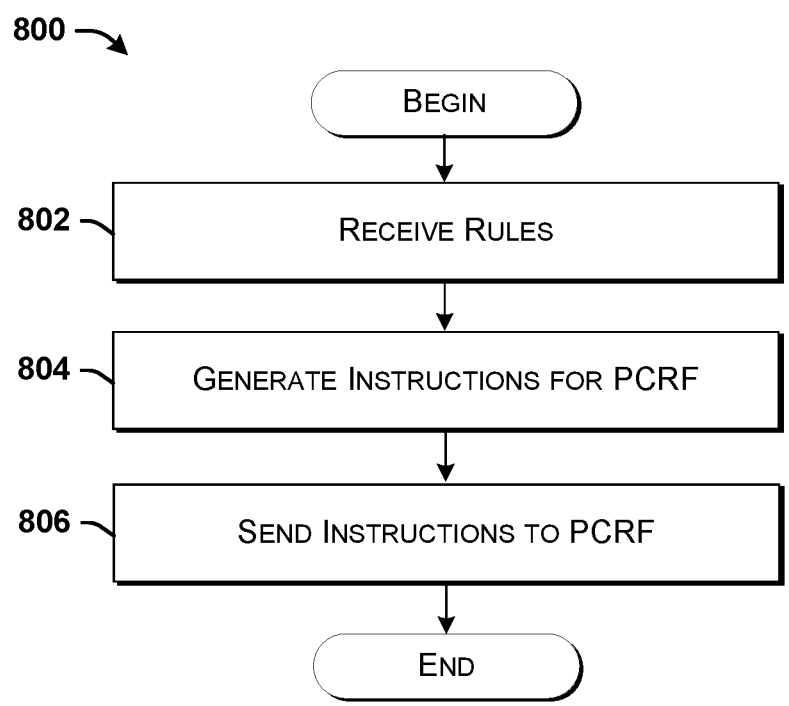
FIG. 8 schematically illustrates a method for operating a policy configuration and provisioning system, according to an exemplary embodiment of the present disclosure.

The PCPS 128 can receive rules from the PIRS 126, generate instructions for the PCRF 108, other elements in the network layer, and/or application servers, and send the instructions to the appropriate policy element. An exemplary method for operating the PIRS 126 is illustrated in FIG. 8 and described in detail below.

Figure 4:
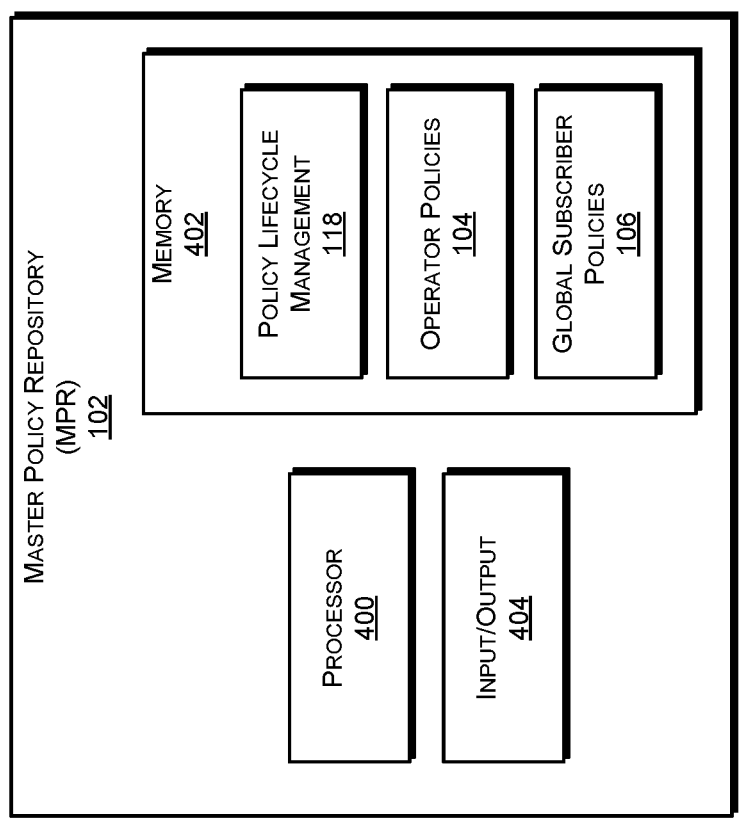
FIG. 4 schematically illustrates a master policy repository, according to an exemplary embodiment of the present disclosure.

Referring now to FIG. 4, the master policy repository (MPR) 102 is illustrated, according to an exemplary embodiment of the present disclosure. The illustrated MPR 102 includes a processor 400 that can be in communication with a memory 402, and an input/output (I/O) interface 404 via a bus (not shown). The processor 400 can be a single or multiple processor system implemented on a single processor chip or multiple processor chips for controlling, and/or processing instructions and/or data stored in the memory 402.

The memory 402 can interface with the processor 400 for the storage of data, policies, and/or instructions, such as policy lifecycle management instructions 118, operator policies 104, and global subscriber policies 106. The memory 402 can include a variety of computer readable media, including volatile media, non-volatile media, removable media, and non-removable media. Computer-readable media can include device storage media and communication media. Storage media can include volatile and/or non-volatile, removable and/or non-removable media, such as, for example, RAM, ROM, EEPROM, flash memory or other memory technology, CD ROM, DVD, or other optical disk storage, magnetic tape, magnetic disk storage or other magnetic storage devices, or any other medium. The I/O interface 404 can be provided to receive policies from the AF's 116, and subscriber profile data 122 and subscription profile data 124 from the ESPR 120, and send policies to the PIRS 126 for rules creation, for example. An exemplary method for operating the MPR 102 is illustrated in FIG. 6 and described in detail below.

Figure 5:
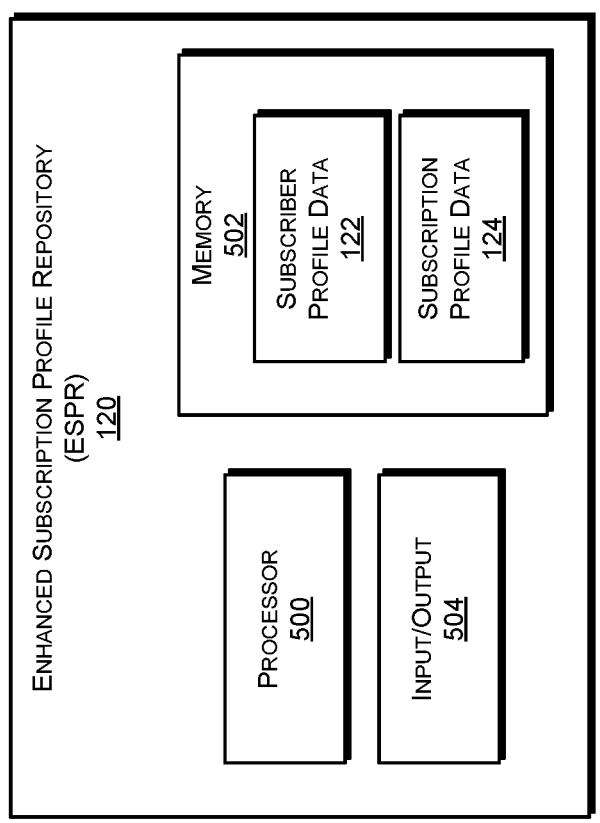
FIG. 5 schematically illustrates an enhanced subscription profile repository, according to an exemplary embodiment of the present disclosure.

Referring now to FIG. 5, the enhanced subscription profile repository (ESPR) 120 is illustrated, according to an exemplary embodiment of the present disclosure. The illustrated ESPR 120 includes a processor 500 that can be in communication with a memory 502, and an input/output (I/O) interface 504 via a bus (not shown). The processor 500 can be a single or multiple processor system implemented on a single processor chip or multiple processor chips for controlling, and/or processing instructions and/or data stored in the memory 502.

The memory 502 can interface with the processor 500 for the storage of data and/or instructions, such as policy reconciliation instructions 206 and rules determination instructions 208. The memory 502 can include a variety of computer readable media, including volatile media, non-volatile media, removable media, and non-removable media. Computer-readable media can include device storage media and communication media. Storage media can include volatile and/or non-volatile, removable and/or non-removable media, such as, for example, RAM, ROM, EEPROM, flash memory or other memory technology, CD ROM, DVD, or other optical disk storage, magnetic tape, magnetic disk storage or other magnetic storage devices, or any other medium. The I/O interface 504 can be to retrieve data from other subscriber information databases, such as location registers and the like, and send subscriber profile data 122 and subscription profile data 124 to the MPR 102, for example.

Figure 6:
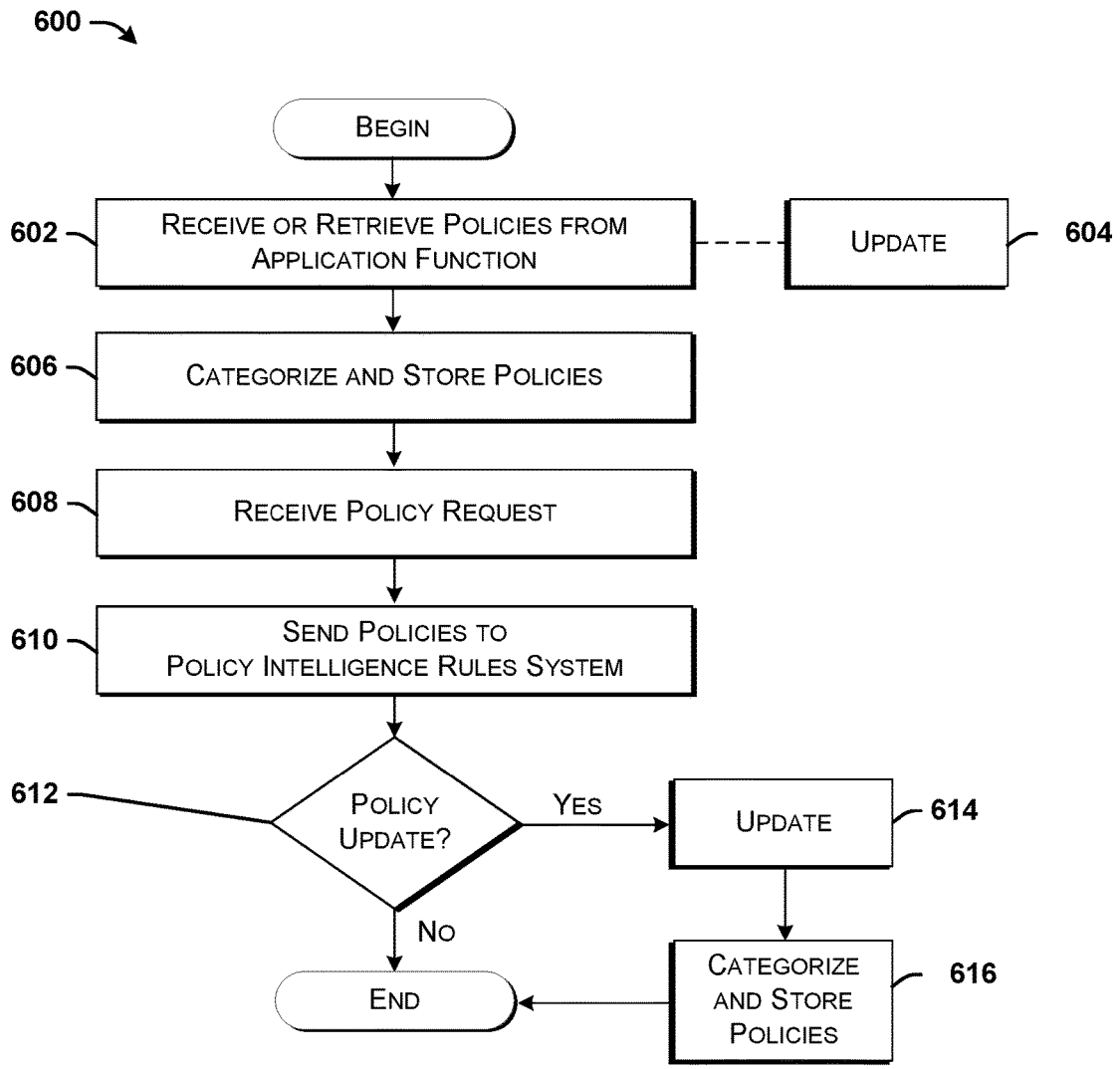
FIG. 6 schematically illustrates a method for operating a master policy repository, according to an exemplary embodiment of the present disclosure.

FIG. 6 schematically illustrates a method 600 for operating a master policy repository, according to an exemplary embodiment of the present disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

The method 600 begins and flow proceeds to block 602, wherein the MPR 102 receives policies. As explained above, and in more detail below, policies can be determined, requested, and/or reconciled during the provisioning of a service or application or not during provisioning of a service or application. The MPR 102 can receive the policies from, for example, one or more AF's 116, the ESPR 120, and/or a network operator. The policies can be received by the MPR 102 in response to a request for policies made by the MPR 102, in response to a request for policies or rules from another network element, and/or without a request. The policies received at the MPR 102 can be application specific, subscriber specific, network specific, and/or a global policy.

As illustrated at block 604, the policies stored at the MPR 102 can be updated at any time. For example, when a new AF 116 is registered with the network, the AF 116 can push policies to the MPR 102. The new policies can be stored by the MPR 102 as new policies, the new policies can be used to update existing policies, and/or the new policies can be used to supplement, replace, and/or render obsolete, and thereby trigger the deletion of, existing policies. Additionally, or alternatively, the MPR 102 can query AF's 116 for policies and update the policies upon recognizing new or changed policies. Similarly, the MPR 102 can receive or retrieve policy updates from network operators and from the ESPR 120. As explained above with respect to the AF 116, the MPR 102 can recognize policies as superfluous, obsolete, or otherwise unnecessary, at which time the MPR 102 can delete or update the policies. The policies stored at the MPR 102 can be updated by network personnel, by the MPR 102, by an application executed by other network elements, and/or by other systems of the network.

As illustrated at block 606, the MPR 102 can categorize and store the received policies. For example, the MPR 102 can organize policies as operator policies 104, global subscriber policies 106, subscriber profile data 122 and/or subscription profile data 124, store the policies as relating to particular services, applications, resources, users, networks, network elements, classes of service, and the like. In some embodiments, the MPR 102 stores the subscriber specific policies 122, 124, and in some embodiments, the ESPR 120 stores the subscriber specific policies 122, 124. Regardless of where the subscriber specific policies 122, 124 are stored, the MPR 102 can access, analyze, and/or store the subscriber specific policies 122, 124 and correlate the subscriber specific policies 122, 124, or a reference thereto, with other policies. As explained above, the MPR 102 can store policies, correlation data, policy analysis applications, and the like, in local or external memory devices.

As illustrated at block 608, the MPR 102 can receive a policy request. The MPR 102 can receive the policy request from a network element, for example, the PIRS 126. The PIRS 126 can request policy information on occurrence of a policy trigger event. A policy trigger event can include, for example, a subscriber request for a network resource such as a service, application, a QoS, or the like. While the PIRS 126 may not know of the policy trigger event, other network elements can communicate the policy request to the PIRS 126 upon occurrence of the trigger event. For example, a PCRF 108 may request instructions for granting, restricting, and/or denying a PDP context request made by a subscriber. The PCRF 108 can communicate the policy request to the PIRS 126, and the PIRS 126 can access policies stored and/or accessible by the MPR 102 to determine how to handle the resource request. The analysis of the policies by the PIRS 126 to generate instructions for the network elements will be discussed in more detail below with reference to FIG. 8.

As illustrated at block 610, the MPR 102 can send policies to a network element, for example, the PIRS 126 or another element that analyzes policies to determine network instructions. To send the policies, the MPR 102 can search the categorized policies to identify any policies pertinent to the PIRS 126 request. For example, if the PIRS 126 requests policies pertaining to location based services, the MPR 102 can search accessible policies for any policies pertaining to location based services. The policies can be stored at the MPR 102 such that any policy related to location based services such as, for example, policies relating to the determination of subscriber location, can be included in the fulfillment of the policy request. Additionally, the MPR 102 can retrieve relevant policies from the ESPR 120, if desired, as explained above. The PIRS 126 can receive the policies and determine a rule for the network to use in addressing the subscriber's request. During rule creation, the PIRS 126 can determine that a policy is obsolete, outdated, or otherwise in need of updating. The PIRS 126 can notify the MPR 102 that an update is needed, and, as shown at block 612, the MPR 102 can receive notification that a policy update is appropriate. The MPR 102 can update, organize, and store the policy or policies, as shown at blocks 614-616, and the method 600 can end. Returning briefly to block 612, if the MPR 102 does not receive a notification that a policy update is appropriate, the method 600 can end.

FIG. 7 schematically illustrates a method 700 for operating a policy intelligence rules system, according to an exemplary embodiment of the present disclosure. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed by execution of computer-readable instructions included on a computer readable medium.

The method 700 begins, and flow proceeds to block 702, wherein a PIRS 126 retrieves and/or receives policies. As explained above, the PIRS 126 can receive operator policies 104, global subscriber policies 106, subscriber profile data 122 and/or subscription profile data 124 from the MPR 102, the ESPR 120, and/or other network elements. In some embodiments, the MPR 102 stores and/or retrieves all policies, and the PIRS 126 receives the policies from the MPR 102. As explained above, the sending of policies to the PIRS 126 can be triggered by occurrence of an event, for example, the request of a network resource by a subscriber.

As illustrated at block 704, the PIRS 126 can analyze the policies to search for policy conflicts. Several types of policy conflicts can exist in the received policies. For example, an operator policy 104 can create a conflict with a global subscriber policy 106 and/or a subscriber policy 122, 124. Additionally, or alternatively, a global subscriber policy 106 can create a conflict with a subscriber policy 122, 124 and/or an operator policy 104. Additionally, or alternatively, a subscriber policy 122, 124 can conflict with an operator policy 104 and/or a global subscriber policy 106. Other policy conflicts are possible. At block 706, the PIRS 126 can determine if any policy conflicts exist in the policies. If the PIRS 126 determines that one or more policy conflicts exist, the PIRS 126 can identify the conflicts, as shown at block 708. Identification of a policy conflict can include, for example, creating data that identifies the policies involved in the policy conflict, tagging the conflicting policies, determining to perform more operations on the policies, and the like.

As illustrated at block 710, the PIRS 126 can resolve any identified policy conflicts. A network operator can specify policy conflict resolution rules and/or the conflicts can be resolved by a policy resolution application including, but not limited to, policy reconciliation instructions 206. For example, the PIRS 126 can be configured to resolve conflicts with operator policies 104 by giving the operator policies 104 precedence. For example, if a network operator determines that certain services should be denied on the basis of privacy, safety, and/or liability concerns, then the network operator can specify an operator policy 104 to deny such services. As such, the PIRS 126 can be configured to address any requests for services addressed by the operator policy 104 by giving the operator policy 104 precedence in policy conflict resolution, thereby determining to deny the service, even if a subscriber policy 122, 124 allows such services.

Similarly, the PIRS 126 can be configured to give subscriber policies 122, 124 precedence over operator policies 104 and/or global subscriber policies 106. For example, an operator policy 104 and/or a global subscriber policy 106 may grant access to a particular resource, while a subscriber policy 122, 124 denies the subscriber access to the same resource that the operator policy 104 and/or the global subscriber policy 106 allow. In such a case, the PIRS 126 can be configured to respect the subscriber's policy over the global subscriber policies 106 and/or operator policies 104 by denying the resource to which all subscribers have access. By way of example, a subscriber can decide to disable SMS for an account. One or more subscriber policies 122, 124 can be generated to reflect the subscriber's choice. The network operator can determine that it wants to grant SMS resources by default to subscribers who request SMS resources. To implement this policy, the network operator can create operator policies 104 and/or global subscriber policies 106 that grant SMS resources by default. When the PIRS 126 receives these conflicting policies, the PIRS 126 can resolve the conflict by giving the subscriber's policies 122, 124 precedence over the operator policies 104 and/or the global subscriber policies 106. As such, though an SMS resource may be granted by default to all subscribers, this particular subscriber can be denied the SMS resource to enforce the subscriber's policies 122, 124. Other conflict scenarios and resolution methods are possible and contemplated.

At block 712, the PIRS 126 determines rules based upon the policies. The PIRS 126 can analyze the policies to determine how the network should handle the request for resources. Determination of the rules can include reconciliation of the policies, to determine which policies should be given precedence, and/or additional operations to determine how the network or application or service should be instructed to implement and/or enforce the determined policy. It should be appreciated that rules can be created by an application, for example, the rules determination instructions 208.

Even if no reconciliation of policies was performed, the PIRS 126 can determine a rule that reflects the course of action needed to grant, restrict, and/or deny the requested resource. As such, the determined rules can reflect a course of action determined by reconciling various policies or one or more policies that had no conflicts with other policies. For example, if analysis of an operator policy 104 reflected a network operator's desire to grant a network resource, and analysis of subscriber policies 122, 124 also resulted in granting of a network resource, the PIRS 126 can generate a rule that reflects the desired course of action, i.e., to grant the requested network resource to the subscriber. In other words, the generated rules can describe the determined course of action that the network should take in response to the resource request. The rule can be passed to other network elements, as illustrated at block 714. One network element that can receive the determined rules is the PCPS 128, as will be described in more detail below with reference to FIG. 8.

Returning briefly to block 706, if the PIRS 126 determines that no policy conflicts exist, the PIRS 126 can proceed to block 712, wherein the PIRS 126 can determine the rule based upon the received policies, as explained above. The determined rule can be passed to a network element, as illustrated at block 714. The method 700 can end.

FIG. 8 schematically illustrates a method 800 for operating a policy configuration and provisioning system, according to an exemplary embodiment of the present disclosure. It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

The method 800 begins, and flow proceeds to block 802, wherein the PCPS 128 receives one or more rules from a network element. As explained above, the one or more rules can be created and transferred by the PIRS 126.

As shown at block 804, the PCPS 128 can analyze the received rules and determine how to instruct one or more elements of the network layer to implement the determined rules. For example, if the PCPS 128 determined that a network resource should be denied, the generated rule received by the PCPS 128 can reflect this determination. The PCPS 128 can analyze the rule to determine what network elements should be instructed to implement the determined rules, i.e., to enforce the policies as reflected by the determined rules. In some embodiments, the instructions do not designate a network element, but reflect a command for granting, restricting, and/or denying a resource.

As shown at block 806, the PCPS 128 can pass the determined rules to the one or more network elements for implementation. In some embodiments, the default recipient of instructions from the PCPS 128 is the PCRF 108. The PCRF 108 can analyze received instructions and determine what network elements should be instructed to implement the received instructions. It should be understood that the PCPS 128 can process the policy provisioning instructions 308 to perform some or all of the steps of blocks 802-806. The method 800 can end.

Figure 9:
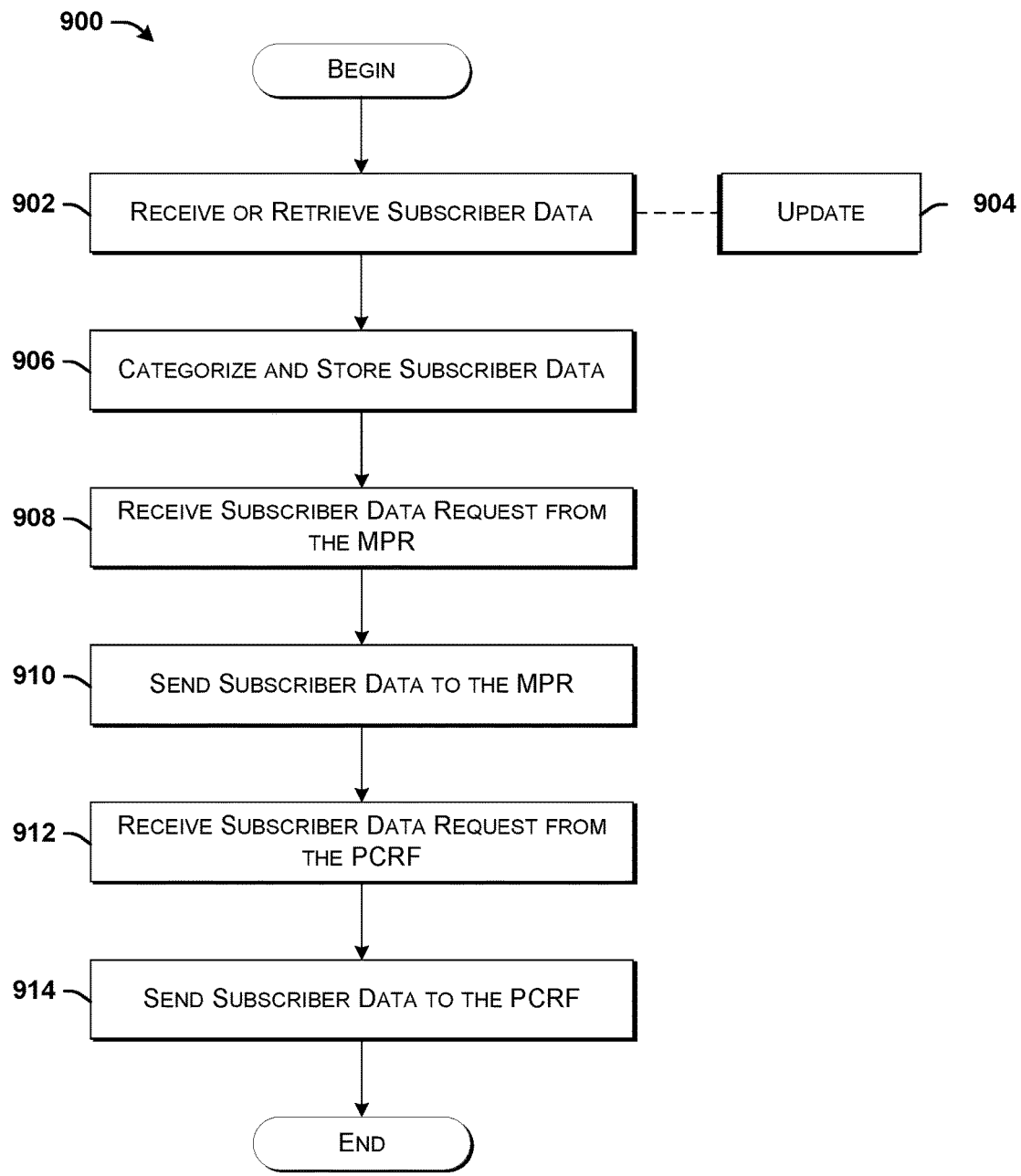
FIG. 9 schematically illustrates a method for operating an enhanced subscription profile repository, according to an exemplary embodiment of the present disclosure.

FIG. 9 schematically illustrates a method 900 for operating an enhanced subscriber policy repository, according to an exemplary embodiment of the present disclosure. It should be understood that the steps of the method 900 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 900 can be ended at any time. Some or all steps of this process, and/or substantially equivalent steps, can be performed by execution of computer-readable instructions included on a computer readable medium.

The method 900 begins, and flow proceeds to block 902, wherein the ESPR 120 receives data relating to subscriber policies. The data can include, for example, subscriber profile data 122 and/or subscription profile data 124. The subscriber profile data 122 and/or subscription profile data 124 can include, but are not limited to, data that indicates subscriber rate plan categories, subscribers' entitlements for rate plan and/or rate plan categories, preemption priorities for differential charging and/or treatment types, service-related roaming entitlements, combinations thereof, and the like. The ESPR 120 can also store subscribers' preferences relating to various services and/or applications. For example, if a subscriber wishes to disable text messaging for an account, a policy reflecting the subscriber's choice can be created and stored as subscriber profile data 122 and/or subscription profile data 124. The various features and resource entitlements of various rate plans can be changed frequently by network personnel. Additionally, a subscriber can change preferences frequently. As such, the data stored in the ESPR 120 can be updated at any time, as illustrated at block 904.

The ESPR 120 can categorize received data and store the data in a storage device associated with the ESPR 120, for example, the memory 502. The ESPR 120 can categorize the received data as, for example, subscriber profile data 122 and/or subscription profile data 124. For example, subscriber preferences and settings can be stored as subscriber profile data, and rate plans and entitlements can be stored as subscription profile data 124. As explained above, additional and/or alternative data categories are possible and are contemplated.

At some time, the ESPR 120 can receive a request for subscriber data from the MPR 102, as illustrated at block 908. As explained above, the MPR 102 can store subscriber data. As such, the ESPR 120 can receive the data request from the MPR 102 during an online policy determination, or during an offline policy determination process.

Although not illustrated, the ESPR 120 can determine relevant subscriber data pertinent to a subscriber data request. For example, the MPR 102 may request subscriber data relating to location based services to provide location based service policies to the PCPS 128, or another network element. As such, the ESPR 120 can search the stored subscriber data to find any policies and/or preferences related to location based services and/or peripheral services needed to provide location based services. As such, the memory 502, or another storage location associated with the ESPR 120, can store instructions for analyzing stored data to identify policies relevant to a received subscriber data request. Regardless of when the subscriber data request is made, the ESPR 120 can fulfill the request by sending subscriber data to the MPR 102, as illustrated at block 910. The MPR 102 can use, store, and/or forward the received subscriber data, as explained above.

As illustrated at block 912, the ESPR 120 can also receive subscriber data requests from the PCRF 108. In particular, the PCRF 108 may send a request for data indicating a subscriber account and/or a rate plan or rate plan category for operations relating to charging. As such, the ESPR 120 can receive a request for stored subscriber profile data 122 and/or subscription profile data 124. As explained above, the ESPR 120 can include instructions that identify data relevant to a received request. Relevant data can be identified and sent to the PCRF 108, as illustrated at block 914. The method 900 can end.

Figure 10:
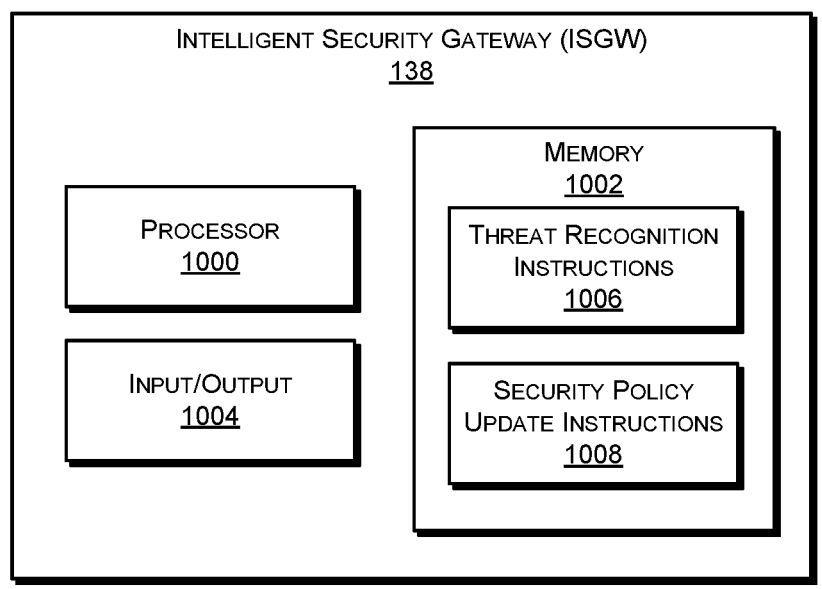
FIG. 10 schematically illustrates a network and application policy and security gateway, according to an exemplary embodiment of the present disclosure.

FIG. 10 illustrates the intelligent security gateway 138 (ISGW), according to an exemplary embodiment of the present disclosure. The illustrated ISGW 138 includes a processor 1000 that can be in communication with a memory 1002, and an input/output (I/O) interface 1004 via a bus (not shown). The processor 1000 can be a single or multiple processor system implemented on a single processor chip or multiple processor chips for controlling, and/or processing instructions and/or data stored in the memory 1002.

The memory 1002 can interface with the processor 1000 for the storage of data and/or instructions, such as threat recognition instructions 1006 and security policy update instructions 1008. The memory 1002 can include a variety of computer readable media, including volatile media, non-volatile media, removable media, and non-removable media. Computer-readable media can include device storage media and communication media. Storage media can include volatile and/or non-volatile, removable and/or non-removable media, such as, for example, RAM, ROM, EEPROM, flash memory or other memory technology, CD ROM, DVD, or other optical disk storage, magnetic tape, magnetic disk storage or other magnetic storage devices, or any other medium. The I/O interface 1004 can be provided to send and/or retrieve data from other information databases, such as the MPR 102 and/or a security threat register, and the like.

As will be explained in more detail below with reference to FIG. 11, the ISGW 138 can be used to monitor network traffic, recognize security threats, and to provide real-time or near-real-time updates of the ISGW 138 and a policy gateway such as the PCRF 108. It should be appreciated that the ISGW 138 can update a security threat register that is stored in a policy repository, for example, the MPR 102, and the MPR 102 can interface with other systems of the policy realization framework 100 to update a policy gateway such as the PCRF 108.

In other words, in some embodiments, the ISGW 138 sends information relating to security threats directly to a policy enforcement and/or access control enforcement point such as, for example, the PCRF 108. In some embodiments, the ISGW 138 retrieves or receives security threat data from a security threat register, for example, the MPR 102, and the ISGW 138 enforces the security policy itself.

Certain network threats are not evident at the network layer or at an access point of the network layer. In fact, some malicious and/or abusive behavior is not recognized until the behavior occurs at the application level, at an element within the network layer, and/or at another level deep within the network. As such, these threats may not be recognizable to a prior art security gateway or access point on the network layer.

According to some embodiments of the present disclosure, the ISGW 138 is configured to communicate with elements past the access point layer, for example, the PCRF 108, the MPR 102, and the like. Since policies can be updated at the MPR 102 by applications 116, and the like, the MPR 102 can contain up-to-date information relating to security threats recognized past the network access point level. The MPR 102 can communicate information relating to the threats to the ISGW 138 so that the ISGW 138 can be more likely to intercept threatening behavior before the malicious user and/or application obtains access to the network.

Additionally, or alternatively, the ISGW 138 can be configured to recognize threats and communicate information relating to the threats to network elements such as, for example, the PCRF 108, the MPR 102, and the like. As such, other network elements can be given access to information relating to security threats identified by the ISGW 138. If a malicious user or application obtains access to the network by bypassing the ISGW 138 or by disguising itself as a bona fide user or application, the other network elements can recognize the threat and be configured to address the threat. When the network elements identify threatening behavior within the network, the network elements can similarly update security threat information, and the ISGW 138 can use the updated security threat information to restrict future access to malicious users or applications that obtained access in the past. As such, it should be appreciated that the ISGW 138 can update information used by network elements to enforce security policies, and that network elements can update information used by the ISGW 138 to enforce security policies.

It should be appreciated that the recognition of new threats by the ISGW 138 can be achieved by execution of the threat recognition instructions 1006 stored in a storage device associated with the ISGW 138, for example, the memory 1002. Furthermore, it should be appreciated that updating of a security threat register can be achieved by execution of security policy update instructions 1008 stored in a storage device associated with the ISGW 138, for example, the memory 1002. Additionally, although not illustrated in FIG. 10, the memory 1002, or another storage device associated with the ISGW 138, can store a register of recognized and/or known security threats, if desired.

Figure 11:
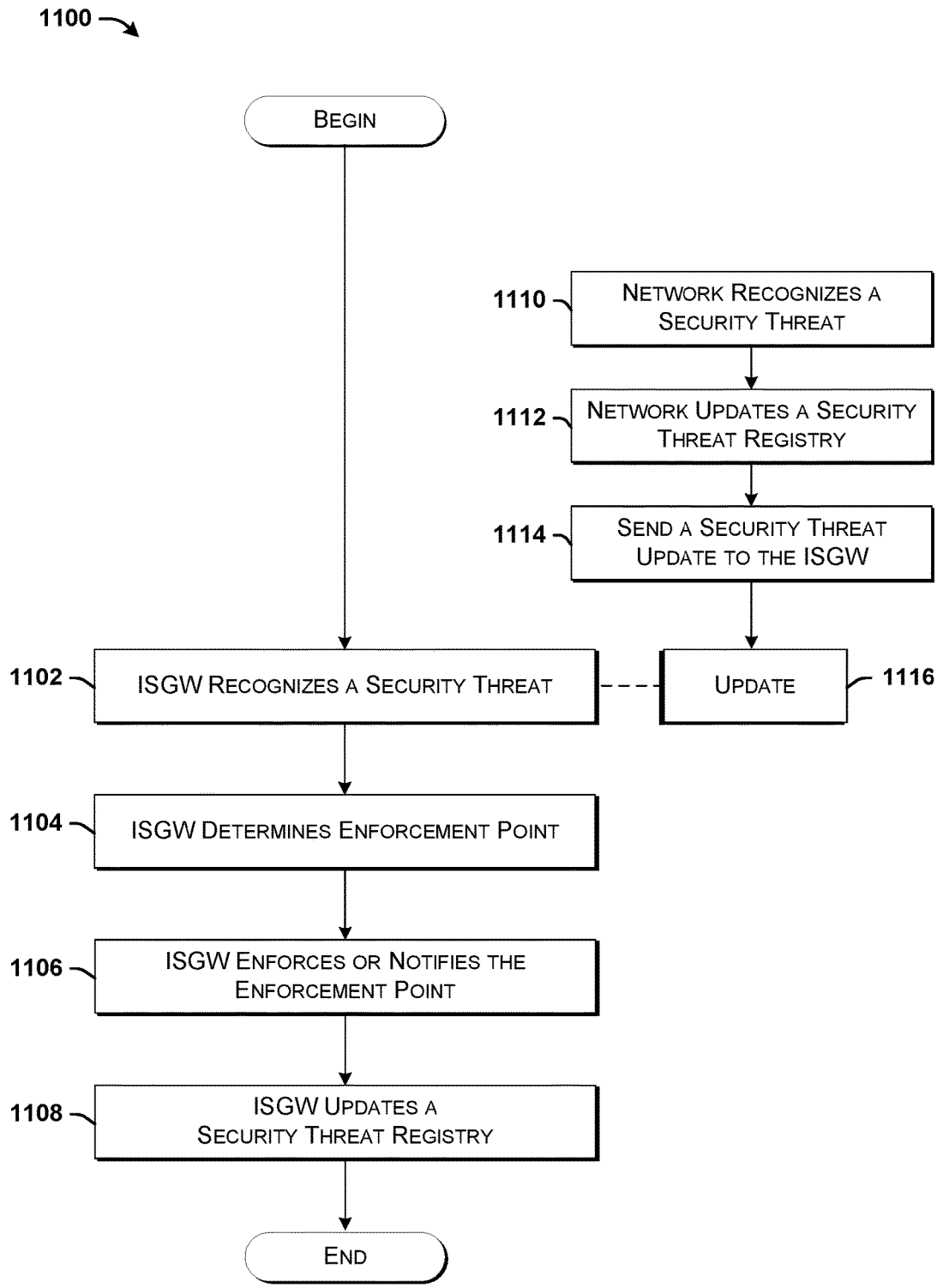
FIG. 11 schematically illustrates a method for operating a network and application policy and security gateway, according to an exemplary embodiment of the present disclosure.

FIG. 11 schematically illustrates a method 1100 for operating an intelligent security gateway 138 (ISGW), according to an exemplary embodiment of the present disclosure. It should be understood that the steps of the method 1100 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1100 can be ended at any time. Some or all steps of this process, and/or substantially equivalent steps, can be performed by execution of computer-readable instructions included on a computer readable medium.

The method 1100 begins, and flow proceeds to block 1102, wherein the ISGW 138 recognizes a security threat. A security threat can be recognized based upon the source of the attempted network access, wherein the source is recognized as a source of past malicious and/or abusive network access; recognition of malicious and/or abusive behavior in the attempted network access; and/or other methods of threat recognition. The ISGW 138 can monitor network traffic and can execute threat recognition instructions 1006 that make the ISGW 138 operable to recognize a security threat. The threat recognition instructions 1006 can include heuristic analysis of the network traffic, recognition of self-modifying code, sandbox analysis, matching users and/or applications with malicious user and/or application databases, combinations thereof, and the like.

As illustrated at block 1104, the ISGW 138 can analyze the security threat to determine an enforcement point for a security policy that addresses the recognized threat. Although not illustrated in FIG. 10, the ISGW 138 can include an enforcement point determination application that determines the malicious intent and/or behavior, and identifies a network element that can neutralize the security threat. In some embodiments, the enforcement point will be the ISGW 138. In some embodiments, the enforcement point will be an access control enforcement point such as the PCRF 108, the PCEF 110, or another network node.

As illustrated at block 1106, the ISGW 138 can enforce a security policy and neutralize the security threat, or the ISGW 138 can send a notification to the appropriate enforcement point determined at block 1104. The notification can include data indicating to the enforcement point, the user and/or application associated with the malicious and/or abusive behavior, and instructions to restrict or deny access to the user and/or application.

As illustrated at block 1108, the ISGW 138 can update a security threat registry. As explained above with reference to FIG. 10, the ISGW 138 can include an internal security threat registry that is stored in the memory 1002, or the ISGW 138 can store security threats in an external storage device. In some embodiments, the security threat registry is stored at the MPR 102, or another registry of the policy realization framework 100. In some embodiments, the ISGW 138 maintains a local copy of the security threat registry, and synchronizes the security threat registry with a security threat registry at the MPR 102 upon notification of a new security threat, at designated intervals, upon receipt of a command to synchronize from a network operator, or at other times. The method 1100 can end.

Some malicious users and/or applications are able to obtain access to the network by emulating bona fide users and/or applications at the access point level of the network. As such, the ISGW 138 may not recognize the security threat. A network element can recognize the threat when the malicious and/or abusive user or application begins exhibiting improper behavior within the network. As such, the network can recognize a security threat, as illustrated at block 1110. The network element can enforce a security policy and/or notify an enforcement point of the network (not illustrated).

As shown at block 1112, the network can update a security threat registry. As explained above, the security threat registry can be stored at the MPR 102, or another element of the policy realization framework. Additionally, or alternatively, the security threat registry can exist at another storage location on the network. In addition to updating the security threat registry, the network can send a security threat update to the ISGW 138 so the ISGW 138 can recognize a future attempted access by the same or a similar security threat. As explained above, the update can include an indication of the source of the threat, the user who initiated the improper behavior, a behavior that accompanied the improper behavior, or the like. As shown at block 1114, the ISGW 138 can receive the update and update a local security threat registry and/or begin recognition and/or enforcement of the new security threat.

When a future attempt to access the network is recognized as being the same or a similar security threat, the ISGW 138 can implement the steps of blocks 1102-1108 described above, and the method 1100 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A policy intelligence rules system comprising:
   a processor; and
   a computer-readable storage device comprising instructions that, when executed by the processor, cause the processor to perform operations comprising:
   receiving, from a master policy repository, a plurality of policies pertaining to a request for a network resource, wherein the plurality of policies pertaining to the request for the network resource comprise at least one operator policy provided by a network operator and at least one subscriber specific policy provided by a subscriber associated with the request for the network resource,
   analyzing the plurality of policies to determine whether any policy conflicts exist between any of the plurality of policies,
   in response to determining that a policy conflict exists between a first policy of the plurality of policies and a second policy of the plurality of policies, determining that the first policy has precedence over the second policy, wherein the first policy comprises the at least one subscriber specific policy and the second policy comprises the at least one operator policy,
   resolving the policy conflict by giving precedence to the first policy over the second policy,
   generating, based on the first policy having precedence over the second policy, a rule describing a course of action for a communications network to take in response to the request for the network resource, and
   sending the rule to a policy configuration and provisioning server of a policy layer of a policy realization framework of the communications network for use in instructing a policy and charging rules function of a network layer of the policy realization framework.

2. The policy intelligence rules system of claim 1, wherein the operations further comprise identifying the policy conflict, wherein identifying the policy conflict comprises creating data identifying the first policy and the second policy involved in the policy conflict.

3. The policy intelligence rules system of claim 1, wherein the rule is selected from a group consisting of a restricted access rule that restricts access to the network resource, a deny access rule that denies access to the network resource, and an allow access rule that allows access to the network resource.

4. The policy intelligence rules system of claim 1, wherein the operations further comprise identifying the policy conflict, wherein identifying the policy conflict comprises tagging, for conflict resolution, the first policy and the second policy identified in the policy conflict.

5. The policy intelligence rules system of claim 1, wherein the operations further comprise identifying the policy conflict, wherein identifying the policy conflict comprises determining to perform an operation on at least one of the first policy or the second policy identified as part of the policy conflict.

6. The policy intelligence rules system of claim 1, wherein the master policy repository provides an intelligent security gateway with information relating to security threats prior to applications associated with the security threats accessing the communications network.

7. The policy intelligence rules system of claim 1, wherein the at least one operator policy comprises at least one of a gating control policy provided by the network operator, a data throttling policy provided by the network operator, a packet inspection policy provided by the network operator, a security policy provided by the network operator, a privacy policy provided by the network operator, an emergency policy provided by the network operator, or a charging policy provided by the network operator, and wherein the at least one subscriber specific policy comprises a service-specific policy provided by the subscriber.

8. A computer-readable storage device storing computer-executable instructions that, when executed by a processor of a policy intelligence rules system, cause the processor to perform operations comprising:

receiving, from a master policy repository, a plurality of policies pertaining to a request for a network resource, wherein the plurality of policies pertaining to the request for the network resource comprise at least one operator policy provided by a network operator and at least one subscriber specific policy provided by a subscriber associated with the request for the network resource;

analyzing the plurality of policies to determine whether any policy conflicts exist between any of the plurality of policies;

in response to determining that a policy conflict exists between a first policy of the plurality of policies and a second policy of the plurality of policies, determining that the first policy has precedence over the second policy, wherein the first policy comprises the at least one subscriber specific policy and the second policy comprises the at least one operator policy;

resolving the policy conflict by giving precedence to the first policy over the second policy;

generating, based on the first policy having precedence over the second policy, a rule describing a course of action for a communications network to take in response to the request for the network resource; and sending the rule to a policy configuration and provisioning server of a policy layer of a policy realization framework of the communications network for use in instructing a policy and charging rules function of a network layer of the policy realization framework.

9. The computer-readable storage device of claim 8, wherein the operations further comprise identifying the policy conflict, wherein identifying the policy conflict comprises creating data identifying the first policy and the second policy involved in the policy conflict.

10. The computer-readable storage device of claim 8, wherein the rule is selected from a group consisting of a restricted access rule that restricts access to the network resource, a deny access rule that denies access to the network resource, and an allow access rule that allows access to the network resource.

11. The computer-readable storage device of claim 8, wherein the operations further comprise identifying the policy conflict, wherein identifying the policy conflict comprises tagging, for conflict resolution, the first policy and the second policy identified in the policy conflict.

12. The computer-readable storage device of claim 8, wherein the operations further comprise identifying the policy conflict, wherein identifying the policy conflict comprises determining to perform an operation on at least one of the first policy or the second policy identified as part of the policy conflict.

13. The computer-readable storage device of claim 8, wherein the master policy repository provides an intelligent security gateway with information relating to security threats prior to applications associated with the security threats accessing the communications network.

14. The computer-readable storage device of claim 8, wherein the at least one operator policy comprises at least one of a gating control policy provided by the network operator, a data throttling policy provided by the network operator, a packet inspection policy provided by the network operator, a security policy provided by the network operator, a privacy policy provided by the network operator, an emergency policy provided by the network operator, or a charging policy provided by the network operator, and wherein the at least one subscriber specific policy comprises a service-specific policy provided by the subscriber.

15. A method comprising:

receiving, by a policy intelligence rules system comprising a processor, from a master policy repository, a plurality of policies pertaining to a request for a network resource, wherein the plurality of policies pertaining to the request for the network resource comprise at least one operator policy provided by a network operator and at least one subscriber specific policy provided by a subscriber associated with the request for the network resource;

analyzing, by the policy intelligence rules system, the plurality of policies to determine whether any policy conflicts exist between any of the plurality of policies;

in response to determining that a policy conflict exists between a first policy of the plurality of policies and a second policy of the plurality of policies, determining, by the policy intelligence rules system, that the first policy has precedence over the second policy, wherein the first policy comprises the at least one subscriber specific policy and the second policy comprises the at least one operator policy;

resolving, by the policy intelligence rules system, the policy conflict by giving precedence to the first policy over the second policy;

generating, by the policy intelligence rules system, based on the first policy having precedence over the second policy, a rule describing a course of action for a communications network to take in response to the request for the network resource; and sending, by the policy intelligence rules system, the rule to a policy configuration and provisioning server of a policy layer of a policy realization framework of the communications network for use in instructing a policy and charging rules function of a network layer of the policy realization framework.

16. The method of claim 15, further comprising identifying the policy conflict, wherein identifying the policy conflict comprises creating data identifying the first policy and the second policy involved in the policy conflict.

17. The method of claim 15, wherein the rule is selected from a group consisting of a restricted access rule that restricts access to the network resource, a deny access rule that denies access to the network resource, and an allow access rule that allows access to the network resource.

18. The method of claim 15, further comprising identifying the policy conflict, wherein identifying the policy conflict comprises tagging, for conflict resolution, the first policy and the second policy identified in the policy conflict.

19. The method of claim 15, further comprising identifying the policy conflict, wherein identifying the policy conflict comprises determining to perform an operation on at least one of the first policy or the second policy identified as part of the policy conflict.

20. The method of claim 15, wherein the master policy repository provides an intelligent security gateway with information relating to security threats prior to applications associated with the security threats accessing the communications network.

* * * * *